(12) United States Patent
Kwon

(10) Patent No.: US 7,944,898 B2
(45) Date of Patent: May 17, 2011

(54) WIRELESS COMMUNICATION METHOD AND APPARATUS

(75) Inventor: Chang-yeul Kwon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1039 days.

(21) Appl. No.: 11/723,860

(22) Filed: Mar. 22, 2007

(65) Prior Publication Data

US 2007/0286140 A1    Dec. 13, 2007

Related U.S. Application Data

(60) Provisional application No. 60/811,761, filed on Jun. 8, 2006.

(30) Foreign Application Priority Data

Sep. 28, 2006    (KR) .................. 10-2006-0095015

(51) Int. Cl.
*H04W 4/00*    (2009.01)
*H04B 7/212*   (2006.01)
*H04L 5/04*    (2006.01)

(52) U.S. Cl. .................. 370/338; 370/322; 370/204

(58) Field of Classification Search .............. 370/338, 370/322, 204
See application file for complete search history.

(56) References Cited

U.S. PATENT DOCUMENTS

| | | | |
|---|---|---|---|
| 6,934,299 B2 * | 8/2005 | Kaatz | 370/459 |
| 7,339,883 B2 * | 3/2008 | Santhoff et al. | 370/203 |
| 2003/0169769 A1 * | 9/2003 | Ho et al. | 370/473 |
| 2004/0038684 A1 * | 2/2004 | Sugaya | 455/450 |
| 2004/0052227 A1 * | 3/2004 | Judd et al. | 370/334 |
| 2004/0120302 A1 * | 6/2004 | Sebire et al. | 370/347 |
| 2005/0089000 A1 * | 4/2005 | Bae et al. | 370/338 |
| 2005/0152394 A1 * | 7/2005 | Cho | 370/442 |
| 2006/0142004 A1 * | 6/2006 | He et al. | 455/434 |

FOREIGN PATENT DOCUMENTS

| | | |
|---|---|---|
| WO | 2005/122528 A1 | 12/2005 |
| WO | 2006/052086 A2 | 5/2006 |

OTHER PUBLICATIONS

Standard ECMA-368, $1^{st}$ edition/Dec. 2005, High Rate Ultra Wideband PHY and MAC Standard.*

* cited by examiner

*Primary Examiner* — Jinsong Hu
*Assistant Examiner* — Marisol Figueroa
(74) *Attorney, Agent, or Firm* — Sughrue Mion, PLLC

(57) ABSTRACT

A wireless communication method and apparatus are provided. The wireless communication method includes receiving a packet including information of a device connected to a wireless network, the wireless network uses a first channel and a second channel supporting different transmission capabilities, and storing the information of the device included in the packet.

30 Claims, 17 Drawing Sheets

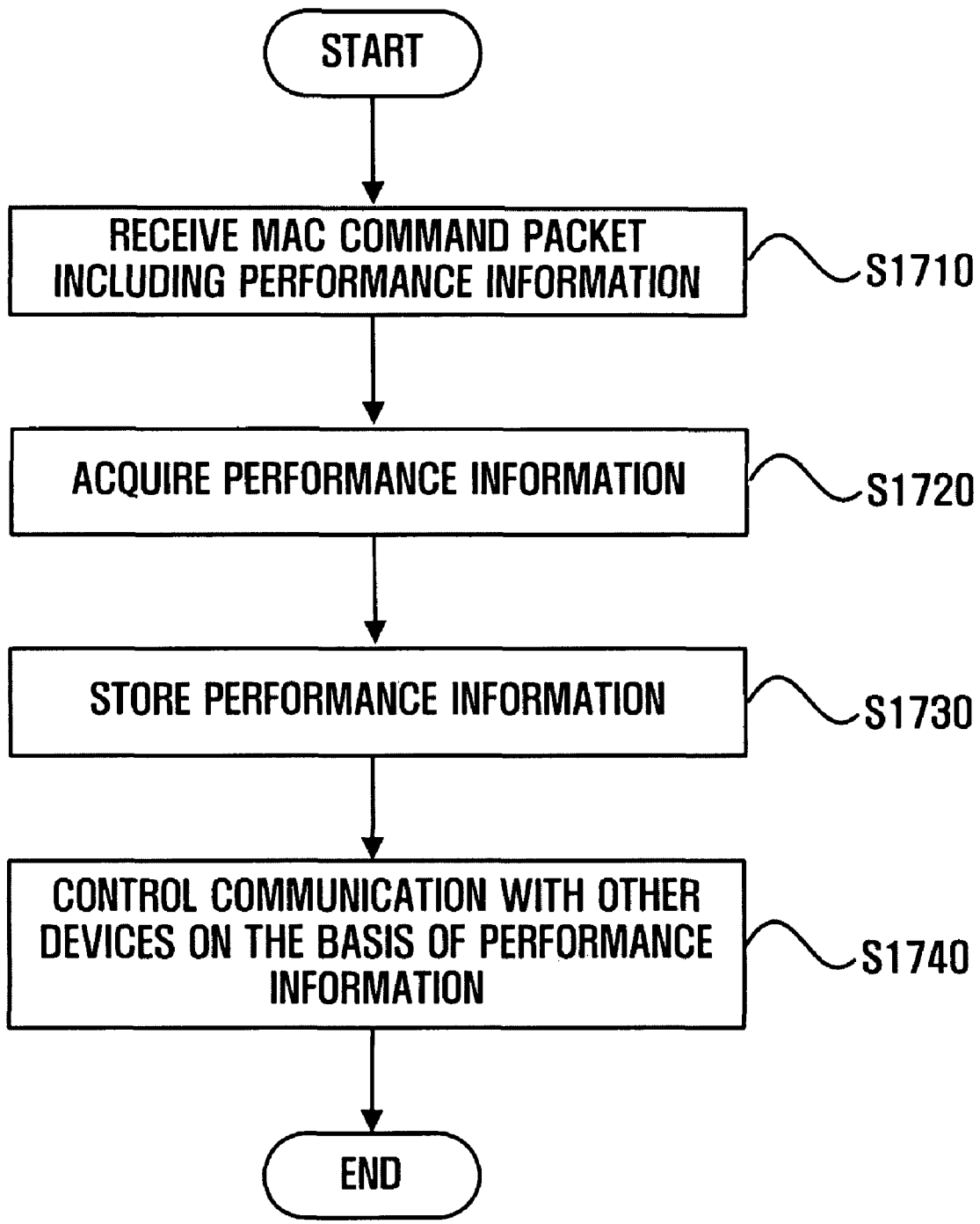

WIRELESS COMMUNICATION METHOD AND APPARATUS

CROSS REFERENCE TO RELATED APPLICATION

This application claims priority from Korean Patent Application No. 10-2006-95015, filed on Sep. 28, 2006 in the Korean Intellectual Property Office, and U.S. Provisional Application No. 60/811,761, filed on Jun. 8, 2006 in the U.S. Patent and Trademark Office, the disclosures of which are incorporated herein by reference in their entirety.

BACKGROUND OF THE INVENTION

1. Field of the Invention

Methods and apparatuses consistent with the present invention relate to wireless communication, and in particular, to a wireless communication method and apparatus that can share performance information for wireless communication between devices and use the performance information.

2. Description of the Related Art

The transmission of mass multimedia data in a wireless network has been increasingly demanded, and studies for an effective transmission method in a wireless network environment have been demanded. In addition, a necessity for wireless transmission of a high-quality video, such as a digital video disk (DVD) video, a high definition television (HDTV) video, or the like, among various home devices tends to increase.

At present, an IEEE 802.15.3c task group is considering a technical standard for transmitting mass data in a wireless home network. This standard, called Millimeter Wave (mm-Wave), uses an electrical wave having a physical wavelength of several millimeters for the sake of the transmission of the mass data (that is, an electrical wave having a frequency of 30 GHz to 300 GHz). In the related art, this frequency band is an unlicensed band and is limitedly used for, for example, communication carriers, radio astronomy, or vehicle anti-collision.

In the IEEE 802.11b standard or the IEEE 802.11g standard, a carrier frequency is 2.4 GHz, and a channel bandwidth is about 20 MHz. Further, in the IEEE 802.11a standard or the IEEE 802.11n standard, a carrier frequency is 5 GHz, and a channel bandwidth is about 20 MHz. In contrast, in the mmWave, a carrier frequency of 60 GHz is used, and a channel bandwidth is about 0.5 to 2.5 GHz. Accordingly, it can be seen that the mmWave uses much larger carrier frequency and channel bandwidth than the existing IEEE 802.11 standards. As such, if a high-frequency signal having a wavelength in millimeters (Millimeter Wave) is used, a high transmission rate of several Gbps can be obtained, and the size of an antenna can be set to be not more than 1.5 mm. Then, a single chip including the antenna can be implemented.

In recent years, the transmission of uncompressed audio and/or video (A/V) data between wireless apparatuses using a high bandwidth of the millimeter wave has been studied. Compressed A/V data is compressed with a partial loss through processes, such as motion compensation, discrete cosine transform (DCT) conversion, quantization, variable length coding, and the like, such that portions insensitive to the sense of sight or the sense of hearing of a human being are eliminated. Accordingly, in case of the compressed A/V data, deterioration in image quality due to a compression loss may occur. Further, A/V data compression and decompression of the transmitting device and the receiving device need to follow the same standard. In contrast, uncompressed A/V data includes digital values (for example, R, G, and B components) representing pixel components as they are. Accordingly, in case of the uncompressed A/V data, vivid image quality can be provided.

As such, in a high-frequency wireless communication band, a large volume of data is transmitted, and thus more efficient wireless communication needs to be performed. If the individual devices constituting each wireless network can share information about device-supportable performance among the devices, the devices can performs optimum communication in a current communication environment by referring to the performance information of other devices. Accordingly, a technology that shares information about device-supportable performance among the devices is highly demanded.

SUMMARY OF THE INVENTION

According to an aspect of the present invention, there is provided an MAC packet, the MAC packet including a Media Access Control (MAC) Protocol Data Unit (MPDU) including information of a device connected to a wireless network, the wireless network uses a first channel and a second channel supporting different transmission capabilities, and an MAC header including information for transmission of the MPDU.

According to another aspect of the present invention, there is provided a wireless communication apparatus, the wireless communication apparatus including an MAC processing unit generating a packet including its own information, and a transmitting/receiving unit transmitting the packet.

According to still another aspect of the present invention, there is provided a wireless communication method, the wireless communication method including receiving a packet including information of a device connected to a wireless network, the wireless network uses a first channel and a second channel supporting different transmission capabilities, and storing the information of the device included in the packet.

According to yet still another aspect of the present invention, there is provided a wireless communication apparatus, the wireless communication apparatus including a transmitting/receiving unit receiving a packet including information of a device connected to a wireless network, the wireless network uses a first channel and a second channel supporting different transmission capabilities, and a storage unit storing the information of the device included in the packet.

BRIEF DESCRIPTION OF THE DRAWINGS

The above and other aspects of the present invention will become more apparent by describing in detail exemplary embodiments thereof with reference to the attached drawings in which:

FIG. 17 is a flowchart showing a wireless communication process according to another exemplary embodiment of the invention.

DESCRIPTION OF THE EXEMPLARY EMBODIMENTS

Figure 1:
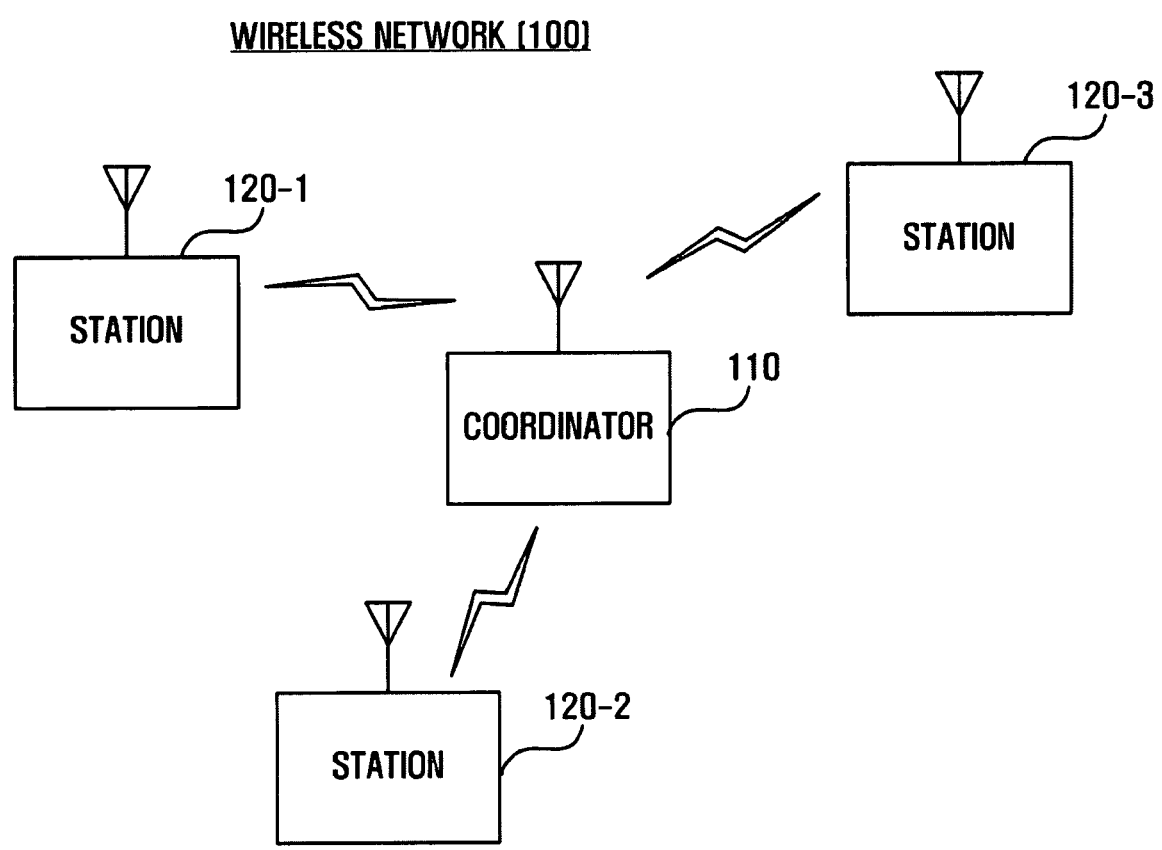
FIG. 1 is a diagram showing a wireless network according to an exemplary embodiment of the invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Hereinafter, exemplary embodiments of the invention will be described in detail with reference to the accompanying drawings.

FIG. 1 is a diagram showing a wireless network 100 according to an exemplary embodiment of the invention. The wireless network 100 is may be a Wireless Video Area Network WVAN ( ) that can support various applications for fast transmission of A/V data. The A/V data to be transmitted through the WVAN may be compressed or uncompressed. For example, the A/V data includes uncompressed 1080$p$ A/V, uncompressed 1080$i$ A/V, MPEG-2 compressed 1080$p$ A/V, uncompressed 5.1 surround sound audio, and the like.

The wireless network 100 shown in FIG. 1 includes a coordinator 110 and stations 120-1, 120-2, and 120-3 (hereinafter, collectively referred to by reference numeral "120").

Of these, the coordinator 110 may be a sink device, such as a flat display, for example, a liquid crystal display (LCD), a plasma display panel, or a digital lighting processing (DLP) projector, a Blue-ray disc (BD) recorder, a high definition (HD)-DVD recorder, or a personal video recorder (PVR). Further, the station 120 may be a source device, such as a set-top box, a BD player, a BD recorder, an HD-DVD player, an HD-DVD recorder, a PVR, an HD broadcast receiver, or the like. Of course, the invention is not limited thereto, and the coordinator 110 and the stations 120 may be implemented by a different type of device. Further, the coordinator 110 may be a source device or the stations 120 may be a sink device.

The devices 110 and 120 of the wireless network 100 can support two physical layers (PHY) of a high-rate PHY (HRP) and a low-rate PHY (LRP). Of course, in the wireless network 100, there may be a device that supports only the LRP according to physical performance. Further, there may be a device that supports the HRP, but performs only one of data transmission and data reception using the HRP.

The HRP can be used for high-speed transmission of data (for example, uncompressed A/V data). Preferably, but not necessarily, the HRP supports an output of several Gbps. In addition, the HRP may use an adaptive antenna technology in order to adjust an output direction or reception direction of a radio signal. In this case, the radio signal output from the HRP has directionality. Accordingly, the HRP can be used for unicast transmission. Since the HRP can perform high-speed transmission, it is preferably used to transmit isochronous data, such as uncompressed A/V data. However, the invention is not limited thereto. For example, the HRP may be used to transmit anisochronous data, an MAC command, antenna steering information, and upper-layer control data for A/V devices.

The LRP can be used for low-speed transmission. For example, the LRP provides a bidirectional link of several Mbps. Since a radio signal output from the LRP is approximately omni-directional, the LRP can be used for unicast and broadcast. The LRP can transmit low-speed isochronous data, such as audio, low-speed anisochronous data, an MAC command including a beacon, an acknowledgement to an HRP packet, antenna steering information, performance information (capability information), and upper-layer control data for A/V devices.

A communication channel to be used by the HRP (hereinafter, referred to as an HRP channel) preferably, but not necessarily, has a bandwidth which is wider than a communication channel to be used by the LRP (hereinafter, referred to as an LRP channel). There are multiple device-supportable HRP channels and LRP channels. Among these, each of the HRP channels may correspond to one or more LRP channels. Preferably, but not necessarily, frequency bands of the LRP channels corresponding to the HRP channel exist within a frequency band of the HRP channel.

Figure 2:
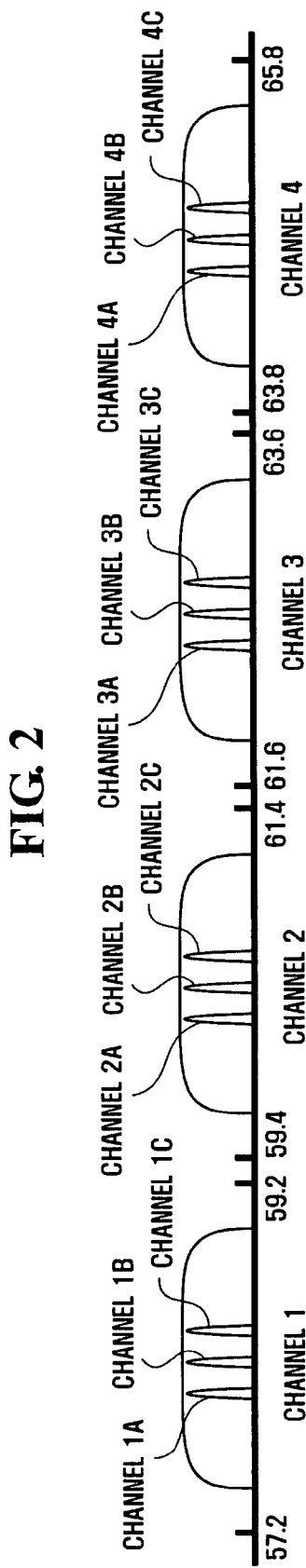
FIG. 2 is a diagram showing frequency bands of an HRP channel and an LRP channel according to an exemplary embodiment of the invention.

FIG. 2 is a diagram showing frequency bands of the HRP channel and the LRP channel according to an exemplary embodiment of the invention. In the frequency bands shown in FIG. 2, four HRP channels (channel 1 to 4) are provided and three LRP channels (channels 1A to 1C, channels 2A to 2C, channels 3A to 3C, and channels 4A to 4C) respectively exist in the frequency bands of the individual HRP channels. The HRP channels have a bandwidth of approximately 2 GHz, and a mean frequency ranges from 60 GHz to several GHz. Examples of the specified frequency bands of the HRP channels shown in FIG. 2 are described in Table 1.

TABLE 1

| HRP Channel Index | Start Frequency | Mean Frequency | End Frequency |
| --- | --- | --- | --- |
| 1 | 57.608 GHz | 58.608 GHz | 59.608 GHz |
| 2 | 59.720 GHz | 60.720 GHz | 61.720 GHz |
| 3 | 61.832 GHz | 62.832 GHz | 63.832 GHz |
| 4 | 63.944 GHz | 64.944 GHz | 65.944 GHz |

In the examples of Table 1, each of the HRP channels has a bandwidth of 2 GHz. Examples of the specified frequency bands of the LRP channels corresponding to the individual HRP channels are described in Table 2.

TABLE 2

| LRP Channel Index | Start Frequency | Mean Frequency | End Frequency |
| --- | --- | --- | --- |
| A | $f_{c(HRP)} - 203$ MHz | $f_{c(HRP)} - 156.75$ MHz | $f_{c(HRP)} - 110.5$ MHz |
| B | $f_{c(HRP)} - 46.25$ MHz | $f_{c(HRP)}$ MHz | $f_{c(HRP)} + 46.25$ MHz |
| C | $f_{c(HRP)} + 110.5$ MHz | $f_{c(HRP)} + 156.75$ MHz | $f_{c(HRP)} + 203$ MHz |

In the examples of Table 2, $f_{c(HRP)}$ is a mean frequency of the corresponding HRP channel, and each of the LRP channels has a bandwidth of 92.5 MHz. Of course, the frequency bands of Table 1 and Table 2 are just examples, and the invention is not limited thereto. For example, the HRP channels and the LRP channels may have different mean frequencies and bandwidths.

As described above, the HRP and the LRP can operate in an overlap frequency band. In this case, the use of the channel may be coordinated by the MAC of the device through a TDMA (Time Division Multiple Access) system. In FIG. 2, Table 1, and Table 2, four HRP channels and three LRP channels corresponding to the individual HRP channels (12 LRP channels in total) are provided, but these numbers are simply for illustrative purposes. The number of device-supportable HRP channels and the number of LRP channels corresponding to each of the HRP channels may vary according to exemplary embodiments.

Returning to FIG. 1, the wireless network 100 is not affected by the number of stations 120. Accordingly, in the wireless network 100, one or more stations 120 or no station may exist. One of the stations 120 can also function as a coordinator 110 according to its own performance. A device having performance capable of functioning as the coordinator 110 is referred to as a coordinator capable device. Coordinator capable devices that want to form a new wireless network can select one of a plurality of HRP channels and one of a plurality of LRP channels corresponding to the selected HRP. If the HRP channel and the LRP channel are selected, the coordinator capable device transmits a beacon packet (hereinafter, simply referred to as a beacon) for managing the wireless network, such that the new wireless network starts. The coordinator capable devices that transmit the beacon so as to start the new wireless network functions as the coordinator 110.

Figure 3:
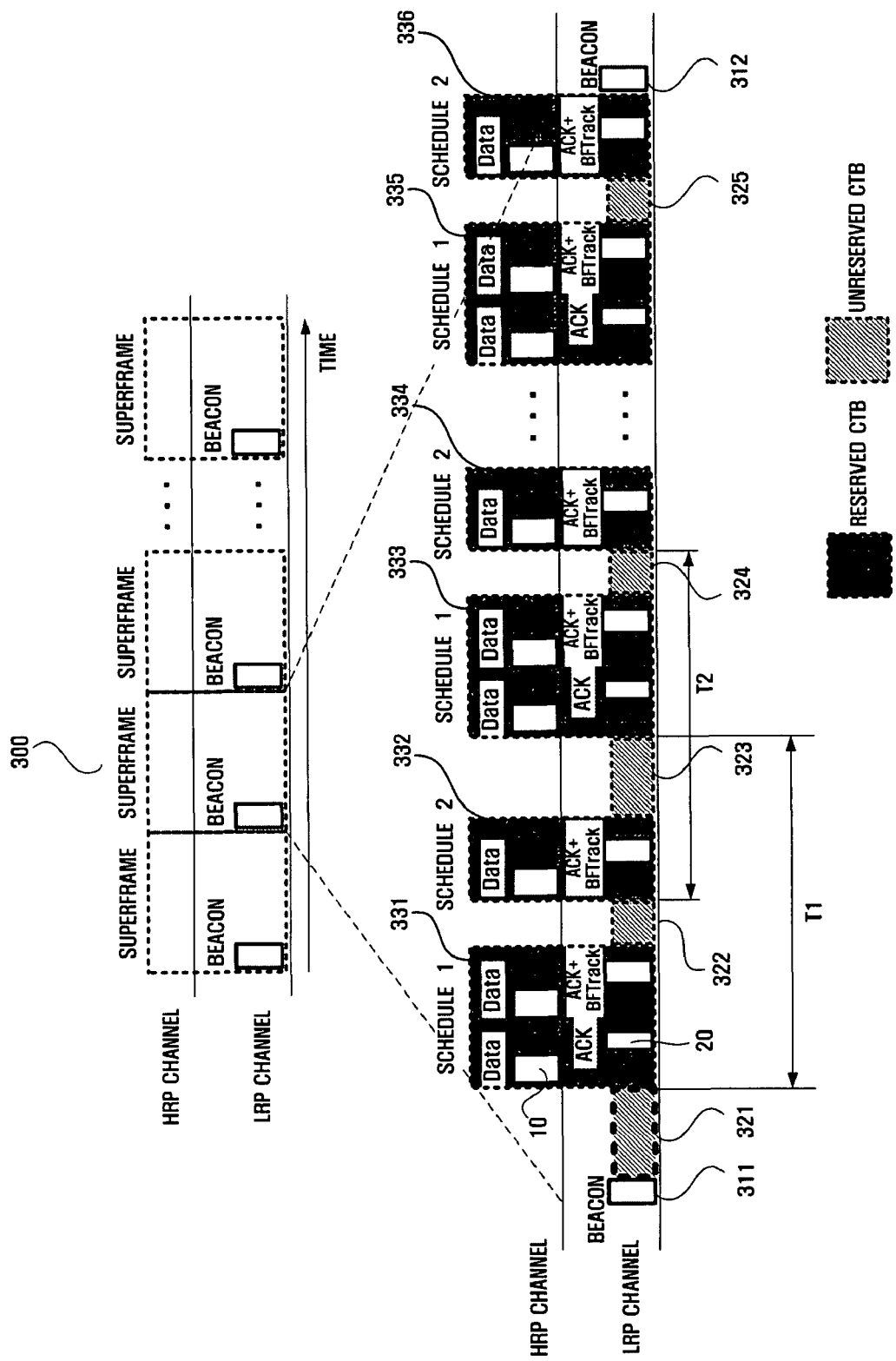
FIG. 3 is a diagram showing a communication timing according to an exemplary embodiment of the invention.

The coordinator 110 adjusts a communication timing in the wireless network 100 through the beacon, and the stations 120 perform communication according to the communication timing adjusted by the coordinator 110. FIG. 3 shows an example of a communication timing that is managed by the coordinator. The communication timing is called a superframe. The superframe 300 includes a beacon period 311 and one or more channel time blocks (CTB) 321 to 325 and 331 to 336.

The beacon period 311 represents the time at which the beacon is transmitted. The beacon includes channel time allocation information, and is broadcasted to the wireless network 100 by the coordinator 110. Accordingly, the stations 120 can know the communication timing by receiving the beacon to be transmitted from the coordinator 110.

The CTBs 321 to 325 and 331 to 336 represent time periods in which the device occupies the medium, that is, channel times. According to an exemplary embodiment of the invention, the CTBs 321 to 325 and 331 to 336 are divided into reserved CTB 331 to 336 (hereinafter, collectively referred to as reference numeral "330") and unreserved CTBs 321 to 325 (hereinafter, collectively referred to as reference numeral "320").

The reserved CTBs 330 represent a channel time that is allocated by the coordinator 110 with respect to a specific station 120. Of course, the coordinator 110 may allocate a channel time for its own. Accordingly, in the reserved CTBs 330, devices 110 and 120 can occupy the medium non-contentiously.

The reserved CTBs 330 can be used for data transmission using the HRP channel. Of course, an acknowledgement 20 of a reception side to data 10 transmitted through the HRP channel is preferably delivered through the LRP channel. Further, though not shown in FIG. 3, according to an exemplary embodiment of the invention, a reserved CTB for LRP channel communication may exist. Accordingly, the reserved CTBs 330 can be used for data transmission in the HRP channel or data transmission in the LRP channel. Then, the devices 110 and 120 can, in the reserved CTBs 330 allocated thereto, transmit/receive uncompressed A/V data through the HRP channel and transmit/receive the acknowledgement of HRP data or various MAC commands through the LRP channel. Herein, a collection of associated reserved CTBs is referred to as a schedule. That is, the schedule represents one reserved CTB or a collection of multiple cyclic reserved CTBs. In FIG. 3, two schedules (schedule 1 and schedule 2) are provided in the superframe.

The unreserved CTBs 320 represent a remaining time period excluding the channel times allocated to the devices 110 and 120 by the coordinator 110. In the unreserved CTBs 320, the devices 110 and 120 can occupy the medium contentiously. The unreserved CTBs 320 can be used for transmission using the LRP channel. Accordingly, the devices 110 and 120 can, in the unreserved CTBs 320, transmit various MAC commands or control packets using the LRP channel. For example, the station 120 can occupy the medium in the unreserved CTBs 320 and then request the coordinator 110 for channel time allocation. As an example of a contention based medium access mechanism to be used in the unreserved CTBs 320, a Carrier Sense Multiple Access (CSMA) system and a slotted Aloha system may be exemplified. Of course, the invention is not limited thereto. Alternatively, a different type of contention based medium access mechanism may be used in the unreserved CTBs 320.

Figure 4:
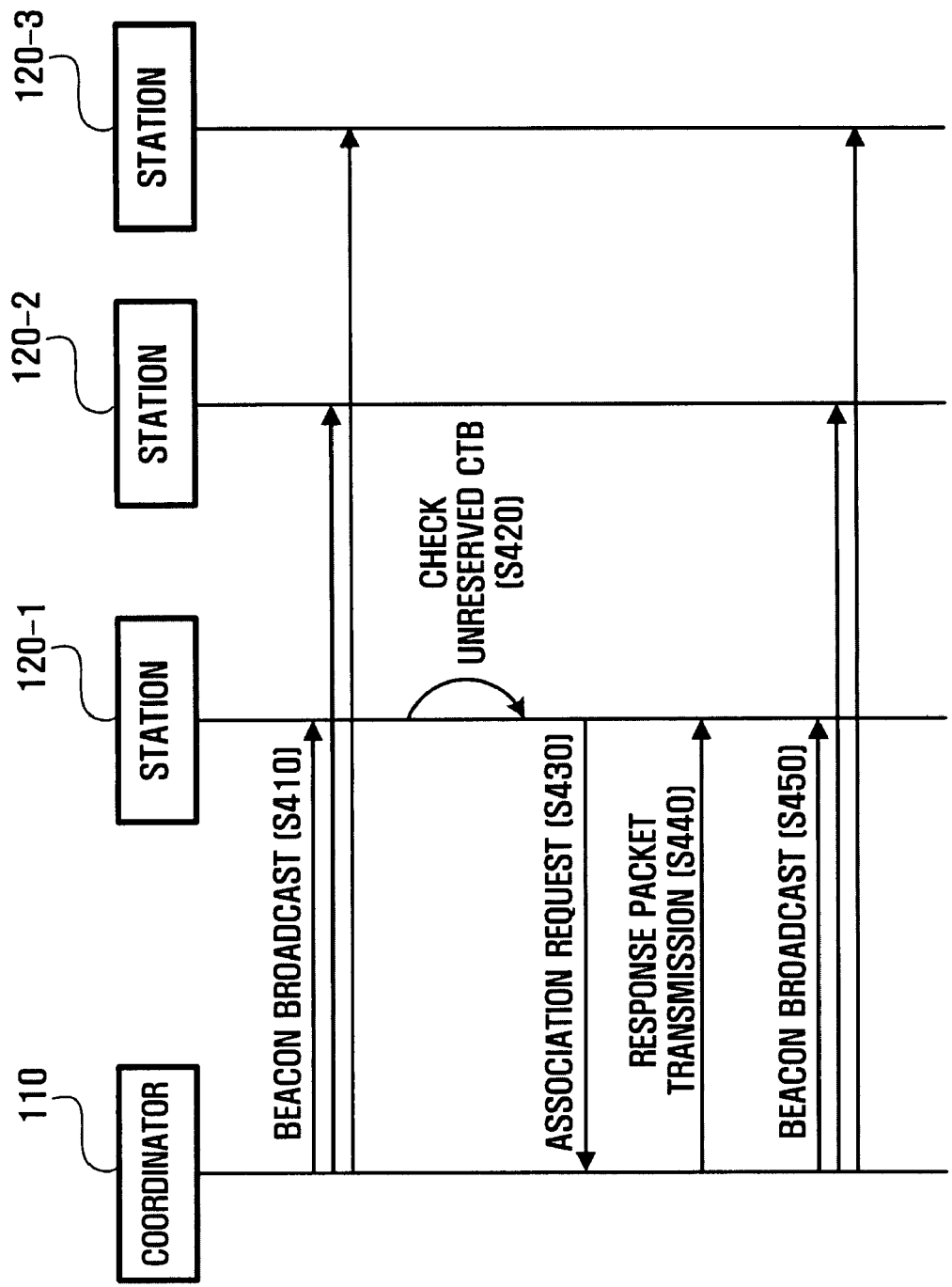
FIG. 4 is a diagram showing a process, in which a station is associated with a wireless network, according to an exemplary embodiment of the invention.

A device that wants to be associated with the wireless network 100 can use the unreserved CTBs 320. FIG. 4 shows an example of an association process of the station 120-1 with the wireless network 100.

If the coordinator 110 broadcasts the beacon (S410), the station 120-1 receives the beacon and checks the unreserved CTB 320 through the received beacon (S420). At this time, the station 120-1 contentiously occupies the medium in the unreserved CTB 320 and then request the coordinator 110 for the association with the wireless network 100 (S430).

The coordinator 110 that receives the association request from the station 120-1 judges whether there is a space in a communication band. To this end, the number of stations constituting the wireless network 100, the amount of the channel time that can be used by the wireless network, and the like may be considered.

If there is a space in the communication band, the coordinator 110 transmits, to the station 120-1, a response packet purporting that the association with the wireless network 100 is permitted (S440). At this time, the coordinator 110 allocates an address to be used by the station 120-1 in the wireless network 100. The address may be included in the response packet.

Next, the coordinator 110 includes information about the association of the station 120-1 in the next beacon and broadcasts the beacon to the wireless network 100 (S450).

The devices 110 and 120 may have different communication capabilities in the wireless network 100. Accordingly, in order to perform more efficient communication, each of the devices 110 and 120 preferably knows performance of other devices. For example, at S430 of FIG. 4, the station 120-1 may transmit its own performance information to the coordinator 110 upon the association request with the wireless network 100. Further, at S450 of FIG. 4, the coordinator 110 may broadcast the beacon including the performance information of the newly associated station 120-1. Then, the performance information of the station 120-1 newly associated with the wireless network 100 can be known to other devices 110, 120-2, and 120-3. Therefore, a device that wants to transmit/receive data with respect to the station 120-1 can perform communication according to the performance of the station 120-1.

Besides, various examples that enable performance information to be shared among the devices can be made. For example, if a first device requests a second device for performance information, the second device may transmit its own performance information to the first device. Further, even though there is no request from other devices, a specific device may transmit its own performance information to other devices.

Figure 5:
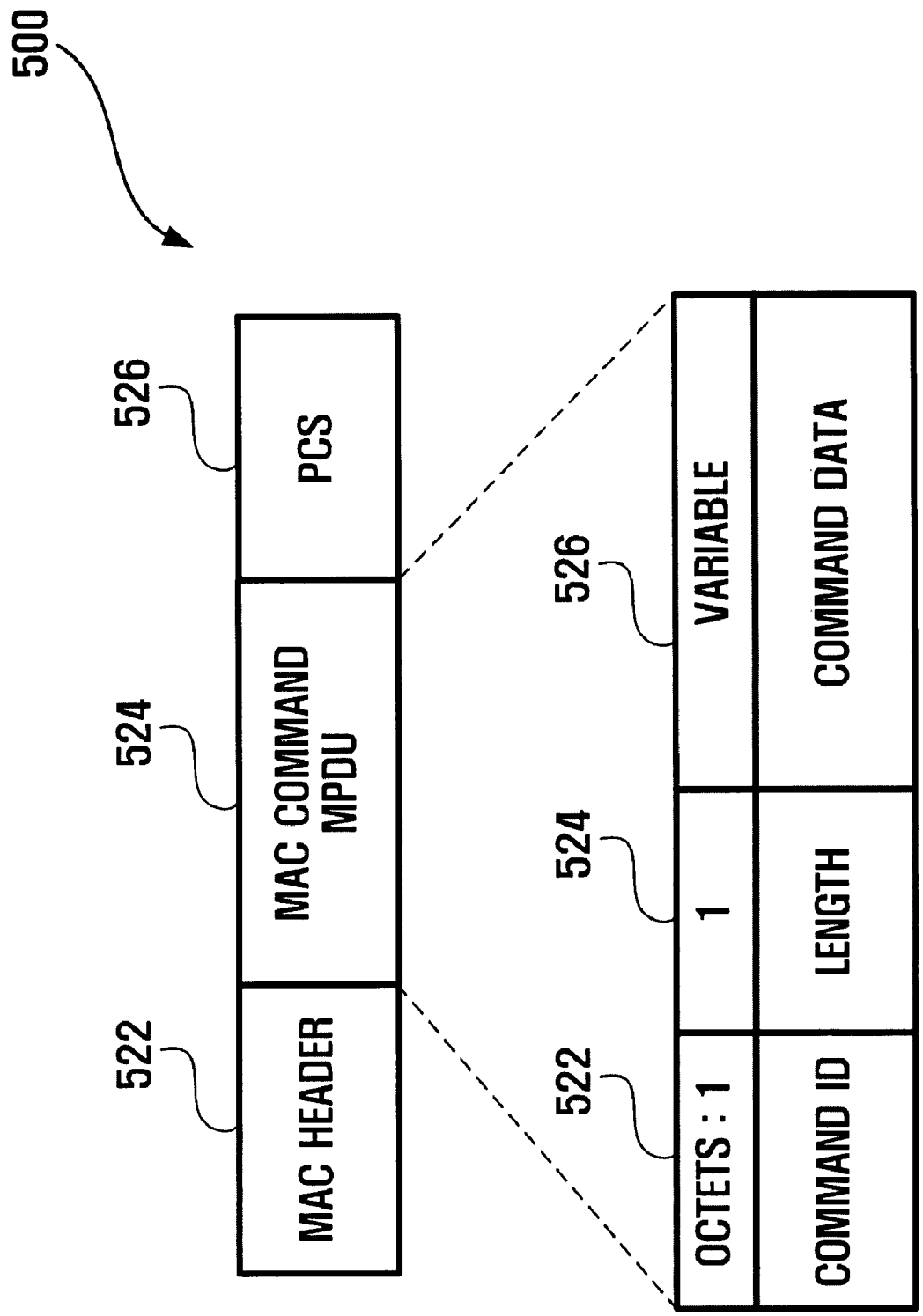
FIG. 5 is a diagram showing an MAC command packet according to an exemplary embodiment of the invention.

According to an exemplary embodiment of the invention, the performance information can be transmitted through an MAC command packet 500 shown in FIG. 5. The beacon described above is a kind of the MAC command packet 500.

The MAC command packet 500 includes an MAC header 510, an MAC command MPDU 520, and a PCS field 530.

The MAC header 510 includes information required for normal transmission of the MAC command MPDU 520. For example, the MAC header 510 includes an address of a device transmitting the MAC command packet 500 and an address of a device receiving the MAC command packet 500, an identifier of the wireless network 100, an acknowledgement (ACK) policy, an identifier indicating the kind of the MAC command packet 500, a protocol version, and the like. Among these, the addresses of the devices and the identifier of the wireless network 100 are allocated by the coordinator 110 in advance.

In the PCS field 530, a cycle redundancy check (CRC) value relative to the MAC command MPDU 520 is set.

The MAC command MPDU 520 includes a command identification (ID) field 522, a length field 524, and a command data field 526. In the command ID field 522, an identifier for identifying the kind of the MAC command is set. In the length field 524, the length of the command data field 526 is set. The command data field 526 includes information to be transmitted. The device can set its own performance information in the command data field 526.

According to an exemplary embodiment of the invention, the performance information of the device includes MAC capability information and PHY capability information. The MAC capability information represents performance for communication in the wireless network 100 to be supported by an MAC layer of the device, and the PHY capability information represents performance for communication in the wireless network 100 to be supported by a PHY layer of the device. The command data field 526 of FIG. 5 may include at least one of the MAC capability information and the PHY capability information.

Figure 6:
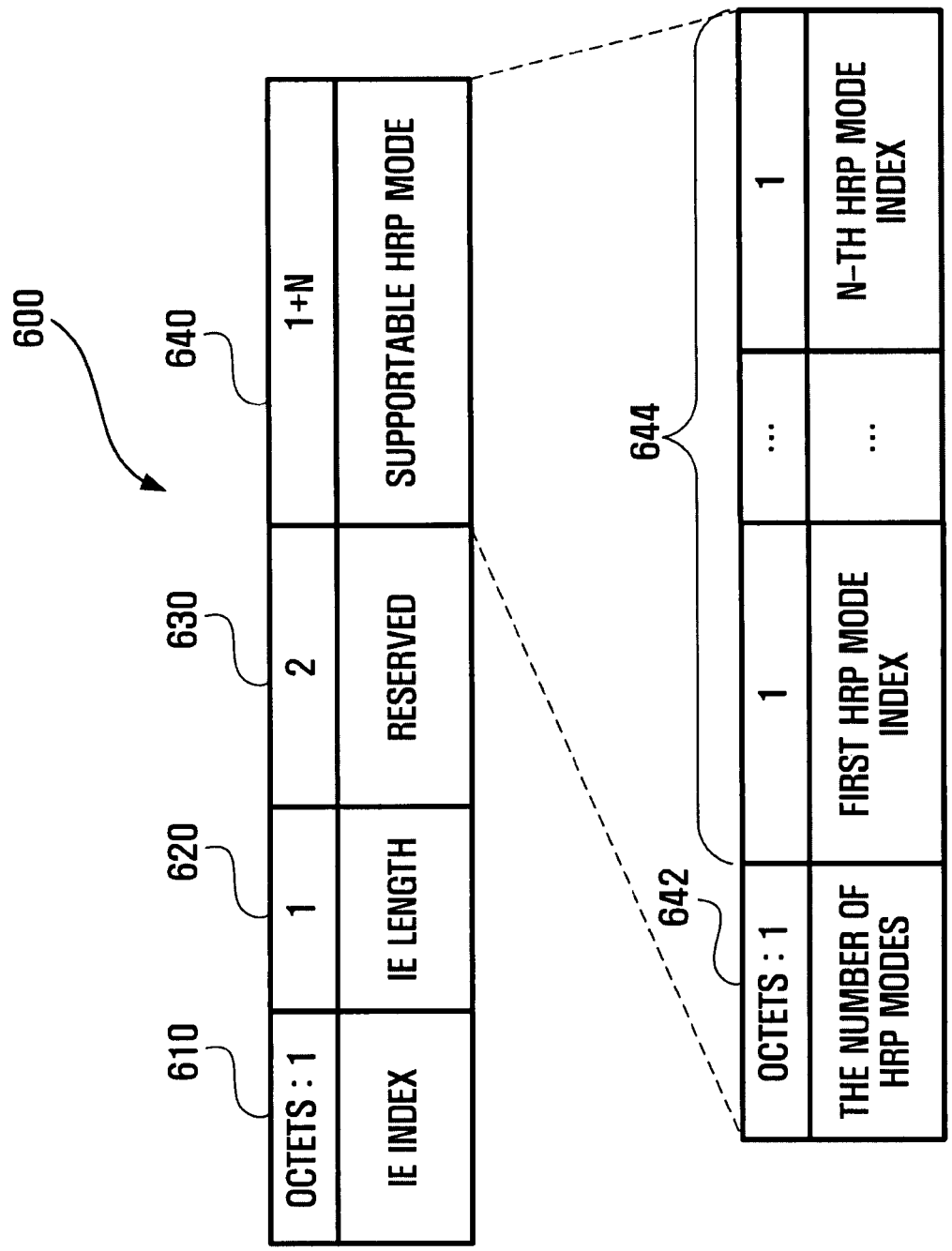
FIG. 6 is a diagram showing a PHY capability information element according to an exemplary embodiment of the invention.

FIG. 6 is a diagram showing a PHY capability information element 600 according to an exemplary embodiment of the invention. The PHY capability information element 600 includes the PHY capability information of the device. In the example of FIG. 6, an information element (IE) index field 610, an IE length field 620, a reserved field 630, and a supportable HRP mode field 640 are included.

The IE index field 610 includes an identifier for identifying the PHY capability information 600. Table 3 shows an IE index table according to an exemplary embodiment of the invention.

TABLE 3

| IE Index | IE Name |
|---|---|
| 0x00 | MAC Address |
| 0x01 | Reserved Schedule |
| 0x02 | MAC capability |
| 0x03 | PHY capability |
| 0x04–0xFF | Reserved |

The individual IEs in Table 3 will be simply described. An MAC address IE includes an MAC address of a device, and a reserved schedule IE includes channel time allocation information. Referring to Table 3, a PHY capability IE has an IE index of 0x02, and thus a value 0x02 can be set in the IE index field.

The IE length field 620 represents the length of the reserved field 630 and the supportable HRP mode field 640. The reserved field 630 is a reserved field for insertion of additional PHY capability information.

The supportable HRP mode field 640 includes information about device-supportable HRP modes. Specifically, the supportable HRP mode field 640 includes a number-of-HRP modes field 642 and at least one HRP mode index field 644.

The number-of-HRP modes field 642 represents the number of HRP mode index fields 644.

The HRP mode index field 644 includes an identifier for identifying a device-usable HRP mode. Here, the HRP mode represents a data processing method to be supported by the HRP of the device, such as a coding mode, a modulation method, a coding rate, or the like. Table 4 shows HRP modes according to an exemplary embodiment of the invention.

TABLE 4

| HRP mode index | Coding Mode | Modulation Method | Coding rate | | Original Data Transmission Rate (Gb/s) |
| --- | --- | --- | --- | --- | --- |
| | | | Upper Bit Level [7] [6] [5] [4] | Lower Bit Level [3] [2] [1] [0] | |
| 0 | EEP | QPSK | 1/3 | | 0.97 |
| 1 | | QPSK | 2/3 | | 1.94 |
| 2 | | 16-QAM | 2/3 | | 3.88 |
| 3 | UEP | QPSK | 4/7 | 4/5 | 1.94 |
| 4 | | 16-QAM | 4/7 | 4/5 | 3.88 |
| 5 | Retransmission | QPSK | 1/3 | infinite | 0.97 |
| 6 | | 16-QAM | 1/3 | infinite | 1.94 |

Referring to Table 4, it can be seen that an Equal Error Protection (EEP) mode is applied when the HRP mode index is in a range of 0 to 2, and a Unequal Error Protection (UEP) mode is applied when the HRP mode index is 3 or 4. Here, the EEP mode and the UEP mode represent coding modes according to an exemplary embodiment of the invention. The EEP mode is a coding mode that applies the same coding rate to individual bits to be transmitted. The UEP mode is a coding mode that applies two or more coding rates to different bits.

Figure 7:
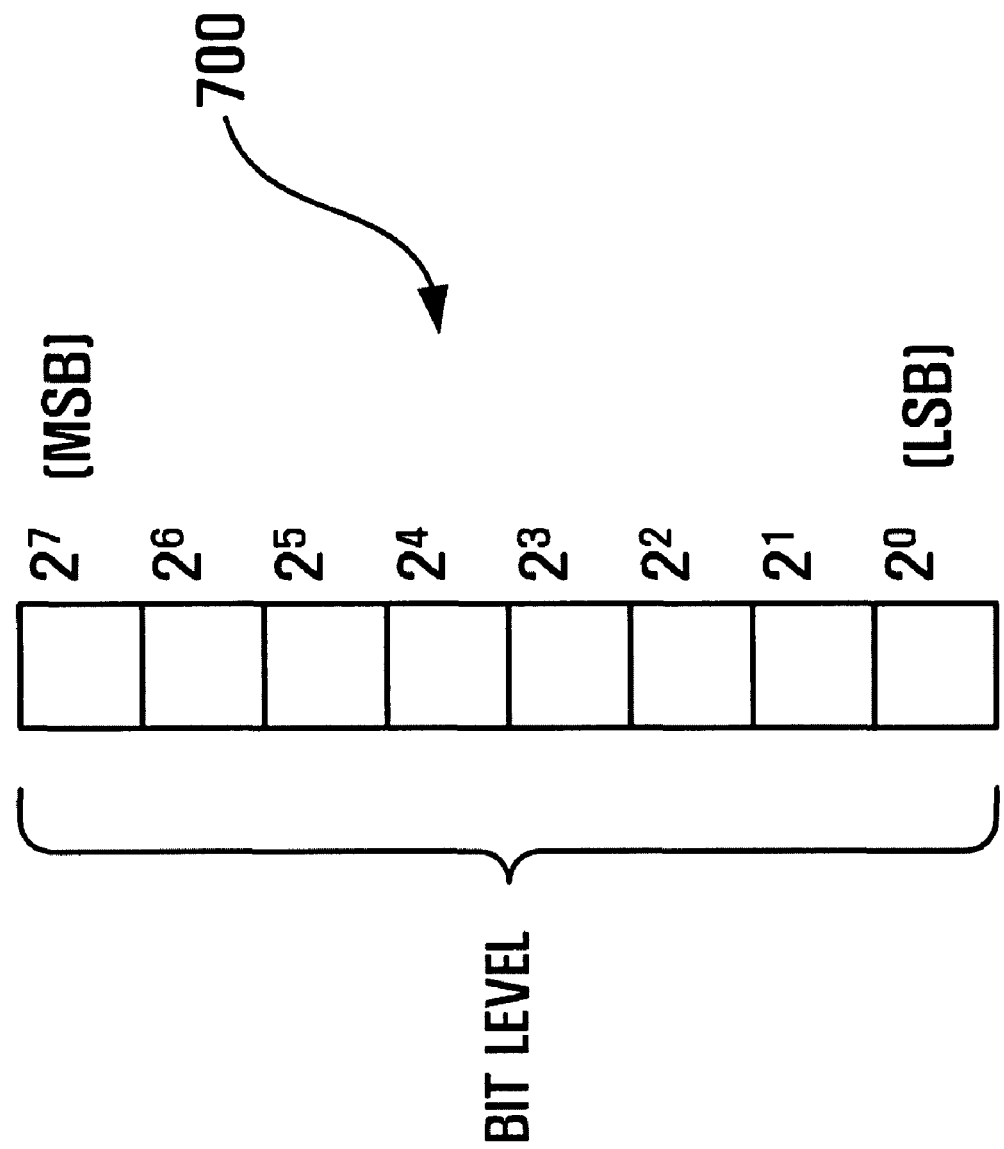
FIG. 7 is a diagram showing bit levels according to an exemplary embodiment of the invention.

For example, in case of an eight-bit video, as shown in FIG. 7, one subpixel component 700 is represented by eight bits. Among these, a bit representing the highest order (the highest bit) is a most significant bit (MSB), and a bit representing the lowest order (the lowest bit) is a least significant bit (LSB). That is, the individual bits in one-byte data having 8 bits may have different importance in decompressing a video signal. If an error occurs in the bit having high importance, complete decompression of the video signal is rarely performed, compared with a case where an error occurs in a bit having lower importance. Accordingly, for the bits having high importance, in order to increase an error correction effect, a lower coding rate than the bits having lower importance is preferably applied. To this end, the UEP mode can be used.

Referring to Table 4, in case of the UEP mode, a comparatively low coding rate of 4/7 is applied to the upper bit levels, and a comparatively high coding rate of 4/5 is applied to the lower bit levels. In this case, the error correction effect on the upper bit levels becomes higher than the error correction effect on the lower bit levels.

Further, the HRP mode indexes 5 and 6 represent the HRP modes that can be used when a transmission error occurs and data is retransmitted. Upon retransmission, a coding rate of 1/3 is applied to the upper bit levels having comparatively high importance, and the lower bit levels having comparatively low importance are not transmitted (a coding rate is infinite).

Meanwhile, as shown in Table 4, it can be seen that the modulation method, such as QPSK or 16-QAM, varies according to the individual HRP modes.

The HRP modes shown in Table 4 are just examples of the invention, and the invention is not limited thereto. Accordingly, there are further HRP modes according to various combinations of the coding mode, the modulation method, and the coding rate.

The HRP mode table shown in Table 4 may be shared by the individual devices (for example, it may be stored in a device at the time of manufacturing or it may be input through a predetermined communication route after manufacturing).

Although a case where the PHY capability information element 600 includes the information about the HRP modes in the above description has been described, the invention is not limited thereto. That is, like the HRP modes, LRP modes may exist. According to other examples, the PHY capability information element 600 may include information about the LRP modes.

Figure 8:
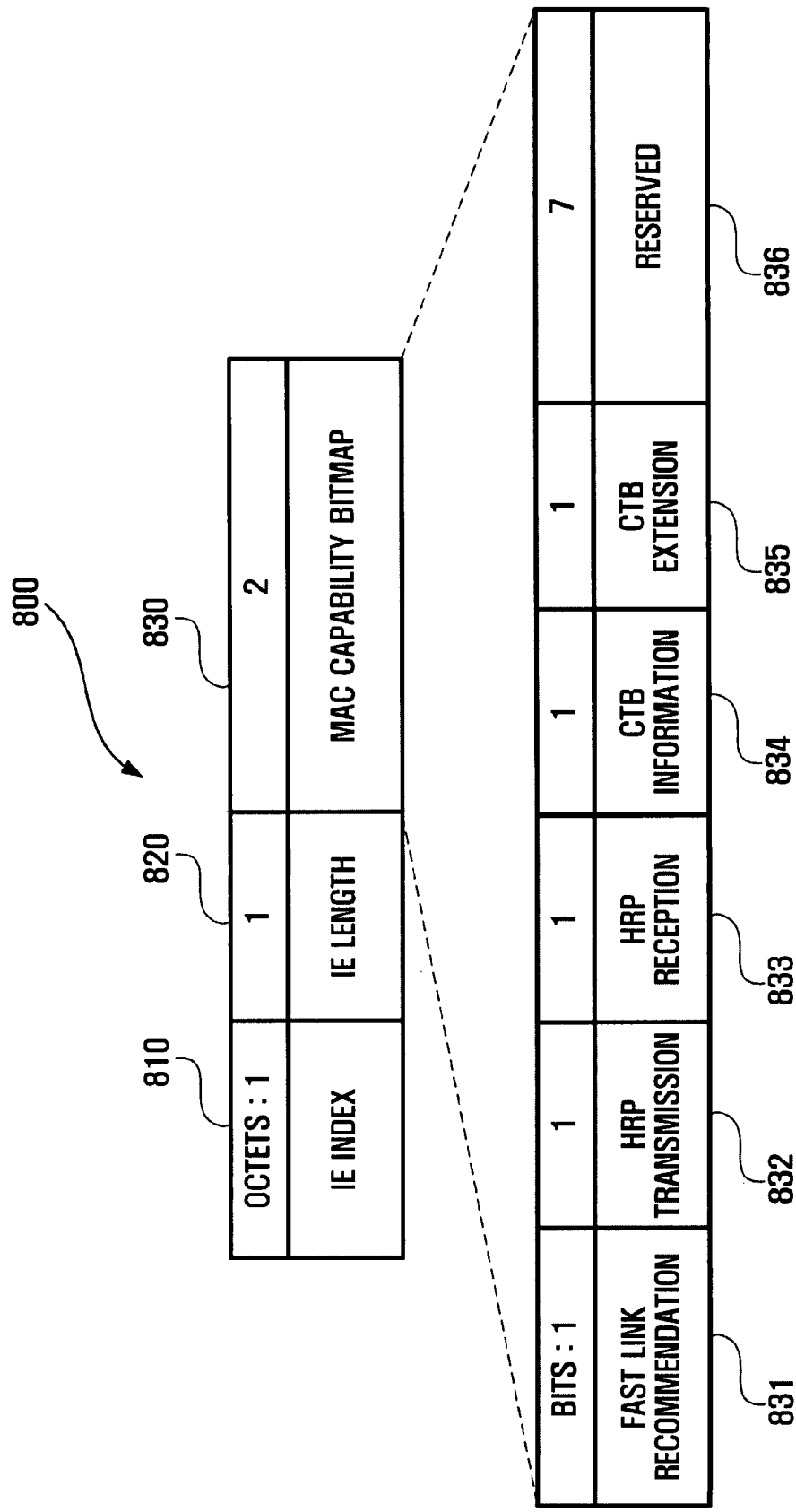
FIG. 8 is a diagram showing an MAC capability information element according to an exemplary embodiment of the invention.

FIG. 8 is a diagram showing an MAC capability information element 800 according to an exemplary embodiment of the invention. The MAC capability information element 800 shown in FIG. 8 includes an IE index field 810, an IE length field 820, and an MAC capability bitmap field 830.

The IE index field 810 includes an identifier for identifying the MAC capability information element 800. If a table shown in Table 1 is used, a value 0x02 can be set in the IE index field.

The IE length field 820 represents the length of the MAC capability bitmap field 830.

The MAC capability bitmap field 830 includes information representing which MAC capability is supported by a device. Specifically, the MAC capability bitmap field 830 includes a fast link recommendation field 831, an HRP transmission field 832, an HRP reception field 833, a CTB information field 834, a CTB extension field 835, and a reserved field 836. Hereinafter, meanings of the individual fields of the MAC capability bitmap field 830 will be described in detail.

The fast link recommendation field 831 represents whether a device can generate and analyze a packet for fast link recommendation. For example, if a device can generate and analyze the packet for fast link recommendation, the fast link recommendation field 831 may be set to "1". Otherwise, the fast link recommendation field 831 may be set to "0". The fact the device can generate and analyze the packet for fast link recommendation means that a fast link recommendation job can be performed. Hereinafter, the fast link recommendation job will be described.

While the source device transmits data to the sink device, the sink device can measure link quality, such as a channel state or quality of a signal to be received. The link quality can be measured through a packet error rate, an signal to noise ratio (SNR), and the like.

If the link quality is degraded to a predetermined level or less, the data transmission rate is inevitably lowered. In this case, in order to increase data transmission efficiency between the source device and the sink device, the coding mode, the coding rate, and the modulation method in the source device need to be switched. At this time, the sink device can determine an appropriate communication mode according to the measured link quality and notice the determined communication mode to the source device. Then, the source device can transmit data using the communication mode recommended by the sink device.

The link recommendation process is divided into two methods of an active mode and a passive mode. In the active mode, the source device requests the sink device for link recommendation, and the sink device provides and notices a communication mode suitable for current link quality as a response to the request. In the passive mode, when it is judged that the link quality is degraded to a predetermined level or less, with no request from the source device, the sink device can provide a communication mode suitable for current link quality.

In such a link recommendation process, when independent packets for link recommendation request information and link recommendation response information are generated and transmitted, additional wireless resources for transmission of the individual packets and reception of acknowledgement to the packets need to be used. According to an exemplary embodiment of the invention, a fast link recommendation job that reduces the amount of the additional wireless resources upon the link recommendation job can be performed. In the fast link recommendation job, the link recommendation request information may be included in a data packet (for example, an uncompressed A/V data packet) that is transmitted from the source device to the sink device. Further, the link recommendation response information may be included in a response packet that is transmitted from the sink device to the source device with respect to the data packet received from the source device.

Figure 9:
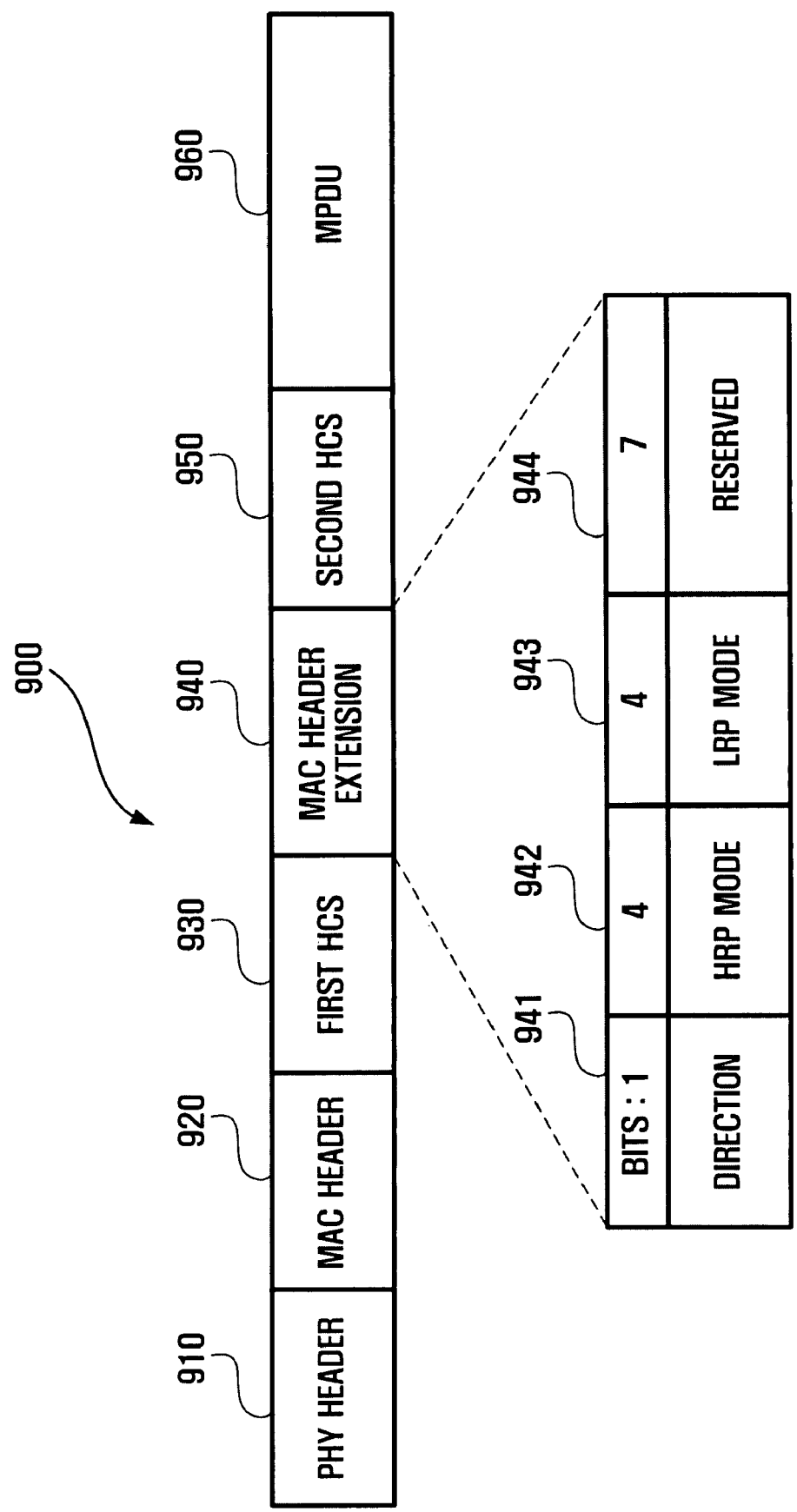
FIG. 9 is a diagram showing a packet to be used for fast link recommendation according to an exemplary embodiment of the invention.

FIG. 9 shows the structure of a packet that can be used for fast link recommendation.

A packet 900 in FIG. 9 includes a PHY header 910, an MAC header 920, a first HCS field 930, an MAC header extension field 940, a second HCS field 950, and an MPDU 960. The MPDU 960 includes data or information to be transmitted. When the packet 900 is a data packet that is transmitted from the source device to the sink device, the MPDU 960 may include uncompressed A/V data. If the packet 900 is a response packet of the sink device with respect to a data packet received from the source device, the MPDU 960 may not include information. The kind of the packet 900 can be set in the MAC header 920.

The PHY header 910 includes information about the HRP mode applied to the packet 900, the length of the MPDU 960, and the like. The first HCS field 930 includes header check sum (HCS) information relative to the PHY header 910 and the MAC header 920, and the second HCS field 950 includes HCS information relative to the MAC header extension field 940.

The MAC header 920 includes an address of a device transmitting the packet 900 and an address of a device receiving the packet 900. Further, the MAC header 920 also includes information about presence/absence of the MAC header extension field 940.

The MAC header extension field 940 is a variable field. The MAC header extension field 940 may be included in the packet 900, as occasion demands. As described above, information representing whether the packet 900 includes the MAC header extension field 940 may be included in the MAC header 920.

The MAC header extension field 940 includes a direction field 941, an HRP mode field 942, an LRP mode field 943, and a reserved field 944.

The direction field 941 is used in order to identity whether the MAC header extension field 940 represents the link recommendation request information or the link recommendation response information. For example, when the direction field 941 is set to "0", the MAC header extension field 940 represents the link recommendation request information. When the direction field 941 is set to "1", the MAC header extension field 940 represents the link recommendation response information.

The HRP mode field 942 and the LRP mode field 943 include information about the HRP mode and the LRP mode to be recommended by the sink device. As an example, the HRP mode index described with reference to Table 4 may be set in the HRP mode field 942, and the LRP mode index may be set in the LRP mode field 943. Of course, the HRP mode field 942 and the LRP mode field 943 may include predetermined information when the MAC header extension field 940 represents the link recommendation response information. When the MAC header extension field 940 represents the link recommendation request information, the HRP mode field 942 and the LRP mode field 943 may be set to null.

The reserved field 944 is a field that is reserved for insertion of additional information relative to link recommendation.

Returning to FIG. 8, the MAC capability information element 800 will be described. The HRP transmission field 832 represents whether a device can transmit data using the HRP. For example, when a device can transmit data using the HRP, the HRP transmission field may be set to "1". Otherwise, the HRP transmission field may be set to "0".

The HRP reception field 833 represents whether a device can receive data using the HRP. For example, when a device can receive data using the HRP, the HRP reception field may be set to "1". Otherwise, the HRP reception field may be set to "0".

The CTB information field 834 represents whether a device can transmit/receive and analyze a CTB information request command and a CTB information response command. For example, when a device can transmit/receive and analyze the CTB information request command and the CTB information response command, the CTB information field 834 may be set to "1". Otherwise, the CTB information field 834 may be set to "0". The CTB information request command is an MAC command that allows the station 120, which does not receive the beacon, request the coordinator 110 for CTB information, that is, channel time allocation information. The CTB information response command is an MAC command for a response of the coordinator 110 to the CTB information request command and includes the channel time allocation information. Hereinafter, examples of the use of the CTB information request command and the CTB information response command will be described.

According to an exemplary embodiment of the invention, at least one of the unreserved CTBs 320 in the superframe described with reference to FIG. 3 may function as a contention based control period (CBCP) 321. The CBCP 321 may be used when the devices 110 and 120 transmit an urgent control command or management command. For example, when the station 120 does not receive the beacon to be transmitted in the beacon period 311, the station 120 does not know the channel time (the reserved CTB 320) allocated thereto. In this case, the station 120 can transmit the CTB information request command to the coordinator 110 in the CBCP 321 and receive the CTB information response command from the coordinator 110.

The CBCP 321 preferably, but not necessarily, exists at a fixed position for each superframe. Accordingly, the station 120 that missed the beacon can use the CBCP 321. More preferably, the CBCP 321 is located immediately after the beacon period 311. In the CBCP 321, the station 120 may try to occupy the medium using the contention based medium access mechanism. Examples of the structures of the CTB information request command and the CTB information response command to be used in the CBCP 321 are shown in FIGS. 10 and 11.

Figure 10:
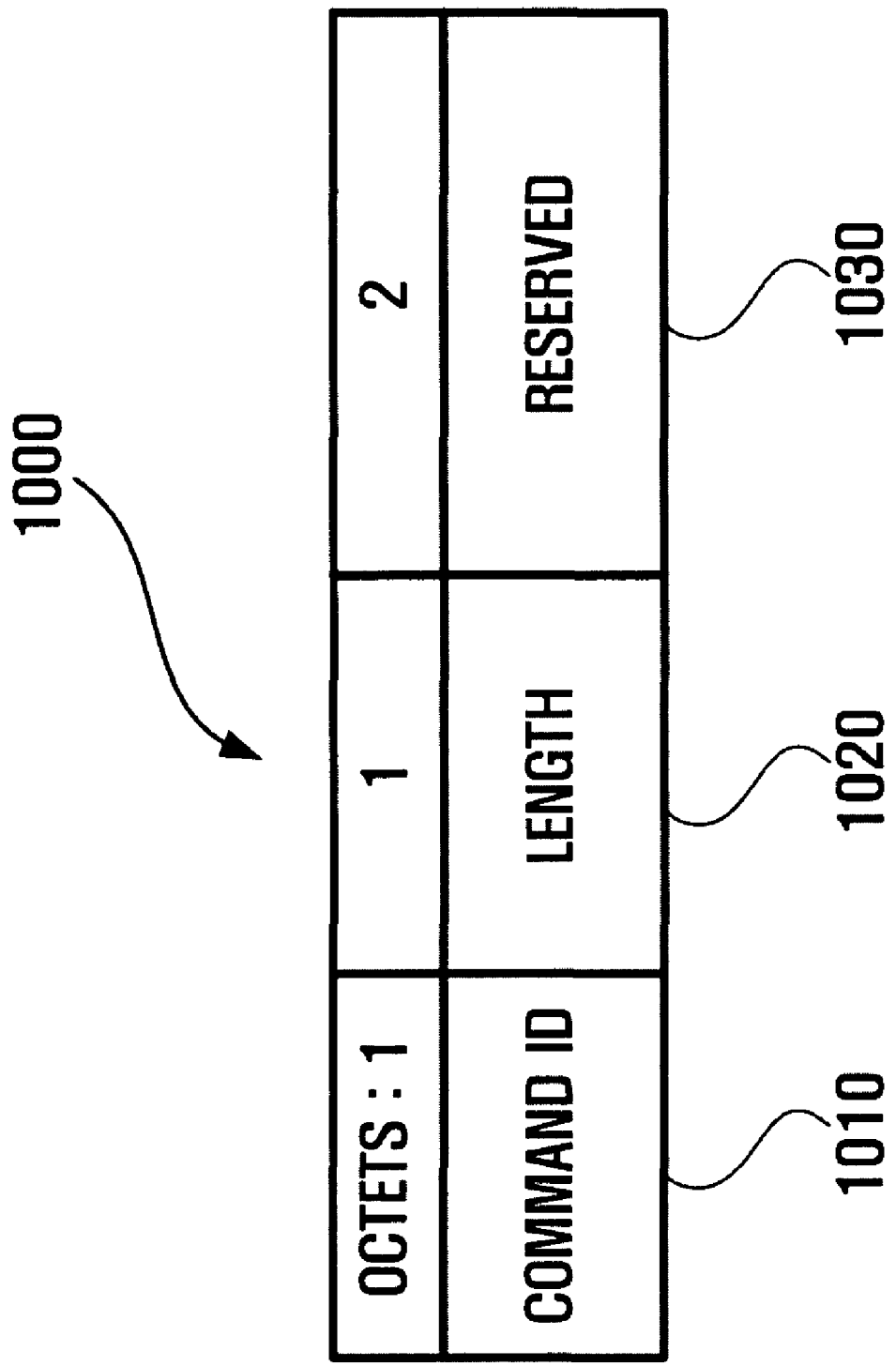
FIG. 10 is a diagram showing a CTB information request command according to an exemplary embodiment of the invention.

FIG. 10 is a diagram showing a CTB information request command 1000 according to an exemplary embodiment of the invention. The CTB information request command 1000 is used when the station 120, which missed the beacon, requests the coordinator 110 for the channel time allocation information in the CBCP 321. The CTB information request command 1000 shown in FIG. 10 includes a command ID field 1010, a length field 1020, and a reserved field 1030.

The command ID field 1010 includes an identifier for identifying the CTB information request command 1000. The length field 1020 represents the length of the reserved field 1030. The reserved field 1030 is a field that is reserved for insertion of additional information for the request of the channel time allocation information.

Figure 11:
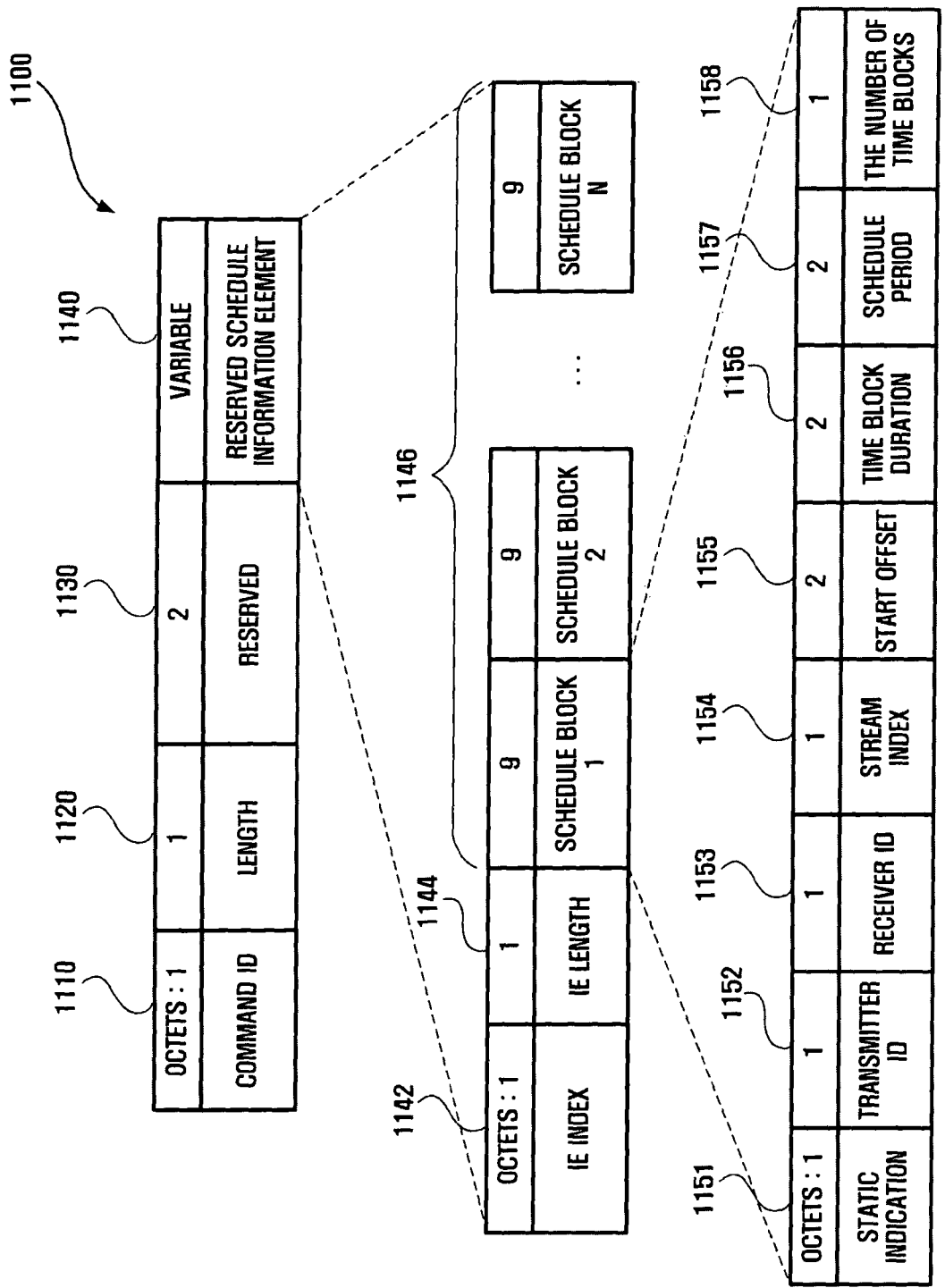
FIG. 11 is a diagram showing a CTB information response command according to an exemplary embodiment of the invention.

FIG. 11 is a diagram showing a CTB information response command 100 according to an exemplary embodiment of the invention. The CTB information response command 1100 is used when the coordinator 110 responses to the request of the channel time allocation information from the station 120. The CTB information response command 1100 shown in FIG. 11 include a command ID field 1110, a length field 1120, a reserved field 1130, and a reserved schedule information element field 1140.

The command ID field 1110 includes an identifier for identifying the CTB information request command 1100. The length field 1120 represents the length of the reserved field 1130 and the reserved schedule information element field 1140. The reserved field 1130 is a field that is reserved for insertion of additional information for the response to the request of the channel time allocation information.

The reserved schedule information element field 1140 includes an IE index field 1142, an IE length field 1144, and at least one schedule block 1146.

The IE index field 1110 includes an identifier for identifying the reserved schedule information element field 1140. The IE length field 1144 represents the length of the schedule block 1146.

Each schedule block 1146 includes a static indication field 1151, a transmitter ID field 1152, a receiver ID field 1153, a stream index field 1154, a start offset field 1155, a time block duration field 1156, a schedule period field 1157, and a number-of-time blocks field 1158.

The static indication field 1151 represents whether a schedule indicated by the schedule block 1150 is a static schedule. The static schedule is allocated for an isochronous stream. Accordingly, the station 120 that is allocated with the static schedule can expect that the same reserved CTB exists in the next superframe. Meanwhile, a dynamic schedule may be allocated for an isochronous stream and an anisochronous stream. The position of the dynamic schedule may vary for each superframe.

The transmitter ID field 1152 and the receiver ID field 1153 represents an address of a device transmitting data and an address of a device receiving data in the schedule indicated by the schedule block 1150. An address to be used in the wireless network 100 may be allocated from the coordinator 110 to the station 120 when the station 120 is associated with the wireless network 100.

The stream index field 1154 indicates a stream corresponding to the channel time allocation information.

The start offset field 1155 indicates a time at which a first CTB in the schedule starts. The start offset field 1155 may be set by a time offset from the start of the beacon to the first CTB. If the schedule block 1146 includes information about the schedule 1 in the superframe shown in FIG. 3, in the start offset field 1155, a time interval from the end point of the beacon period 311 to the start point of the reserved CTB 331 may be set.

The time block duration field 1156 represents the length of each CTB in the schedule.

The schedule period field 1157 represents a difference between start times of two consecutive CTBs included in the same schedule. For example, when the schedule block 1146 includes information about the schedule 1 in the superframe shown in FIG. 3, T1 may be set in the schedule period field 1157. Further, when the schedule block 1146 includes information about the schedule 2 in the superframe shown in FIG. 3, T2 may be set in the schedule period field 1157.

The number-of-time blocks field 1158 represents the number of CTBs allocated to the schedule in one superframe.

The station 120 that receives the CTB information response command 1110 shown in FIG. 11 can know an unreserved CTB that can share the medium contentiously with the reserved CTB allocated thereto.

As can be seen from the above description, the fact a device can transmit/receive and analyze the CTB information request command 1000 and the CTB information response command 1110 means that the device can use the CBCP 321.

Returning to FIG. 8, the MAC capability information element 800 will be described. The CTB extension field 835 represents whether the CTB extension request command and the CTB extension notice command can be transmitted/received and analyzed. For example, when a device can transmit/receive and analyze the CTB extension request command and the CTB extension notice command, the CTB extension field 835 may be set to "1". Otherwise, the CTB extension field 835 may be set to "0". Hereinafter, examples of the use of the CTB extension request command and the CTB extension notice command will be described.

In order to use the channel time more flexibly, according to an exemplary embodiment of the invention, a part or all of the unreserved CTBs may be extended to the reserved CTBs. For example, immediately after the current reserved CTB ends, an unreserved CTB next to the current reserved CTB may be incorporated as the current reserved CTB. The extension of the reserved CTB may be used for the retransmission of the data packet, beam steering, and other purposes. For example, the extension of the reserved CTB may be used when the transmission of the data packet to be transmitted in the current reserved CTB is not completed.

If the extension of the reserved CTB is required while data is transmitted between the coordinator 110 and the station 120 during the reserved CTB, the coordinator 110 may broadcast the CTB extension notice command. The CTB extension notice command is an MAC command that notices the extension of the reserved CTB to other devices.

Figure 12:
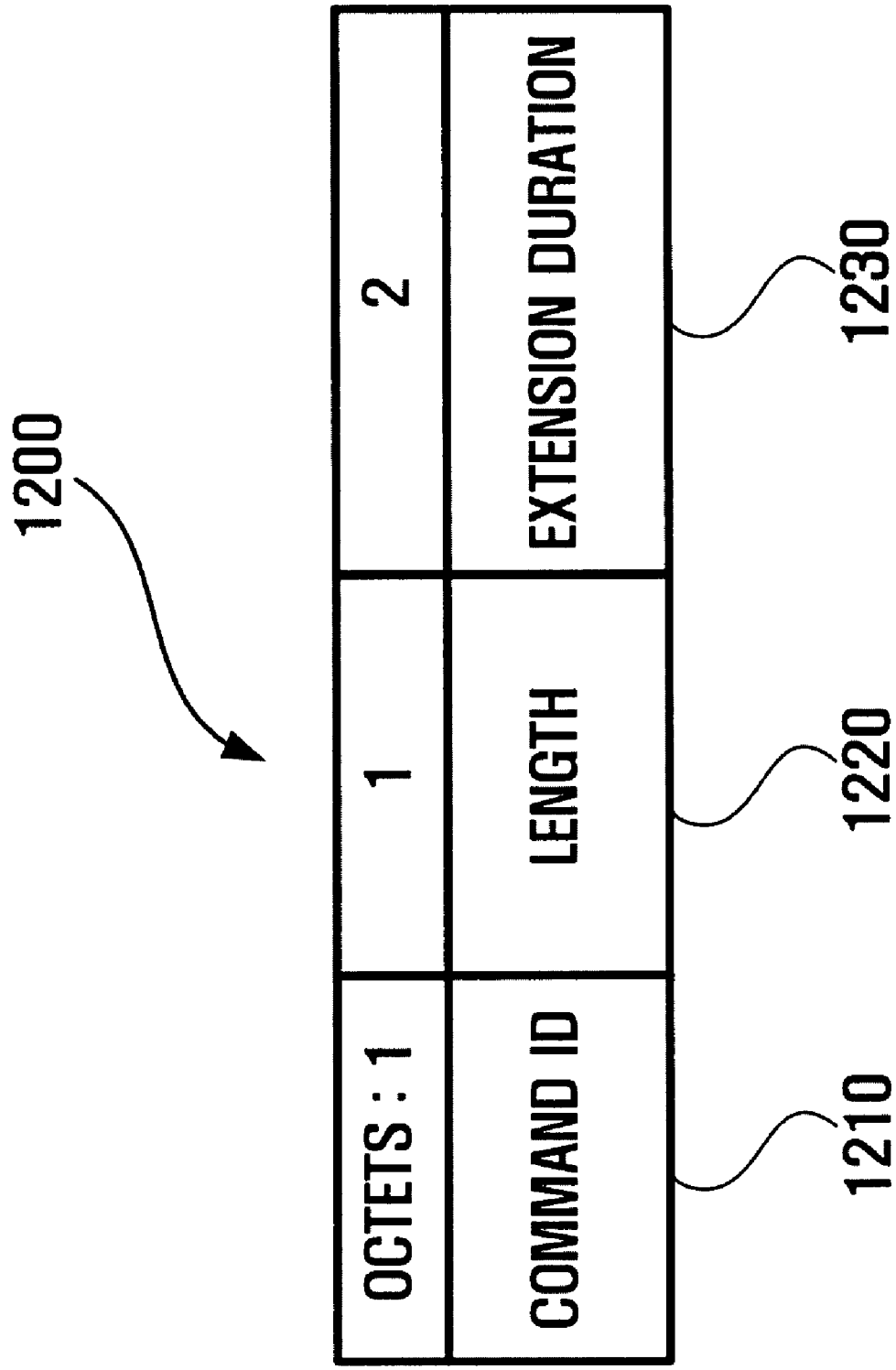
FIG. 12 is a diagram showing a CTB extension notice command according to an exemplary embodiment of the invention.

FIG. 12 shows a CTB extension notice command 1200 according to an exemplary embodiment of the invention. The CTB extension notice command 1200 shown in FIG. 12 includes a command ID field 1210, a length field 1220, and an extension duration field 1230.

The command ID field 1210 includes an identifier for identifying the CTB extension notice command 1200. The length field 1220 represents the length of the extension duration field 1230. The extension duration field 1230 includes extension duration information that represents a time to be additionally used.

Figure 13:
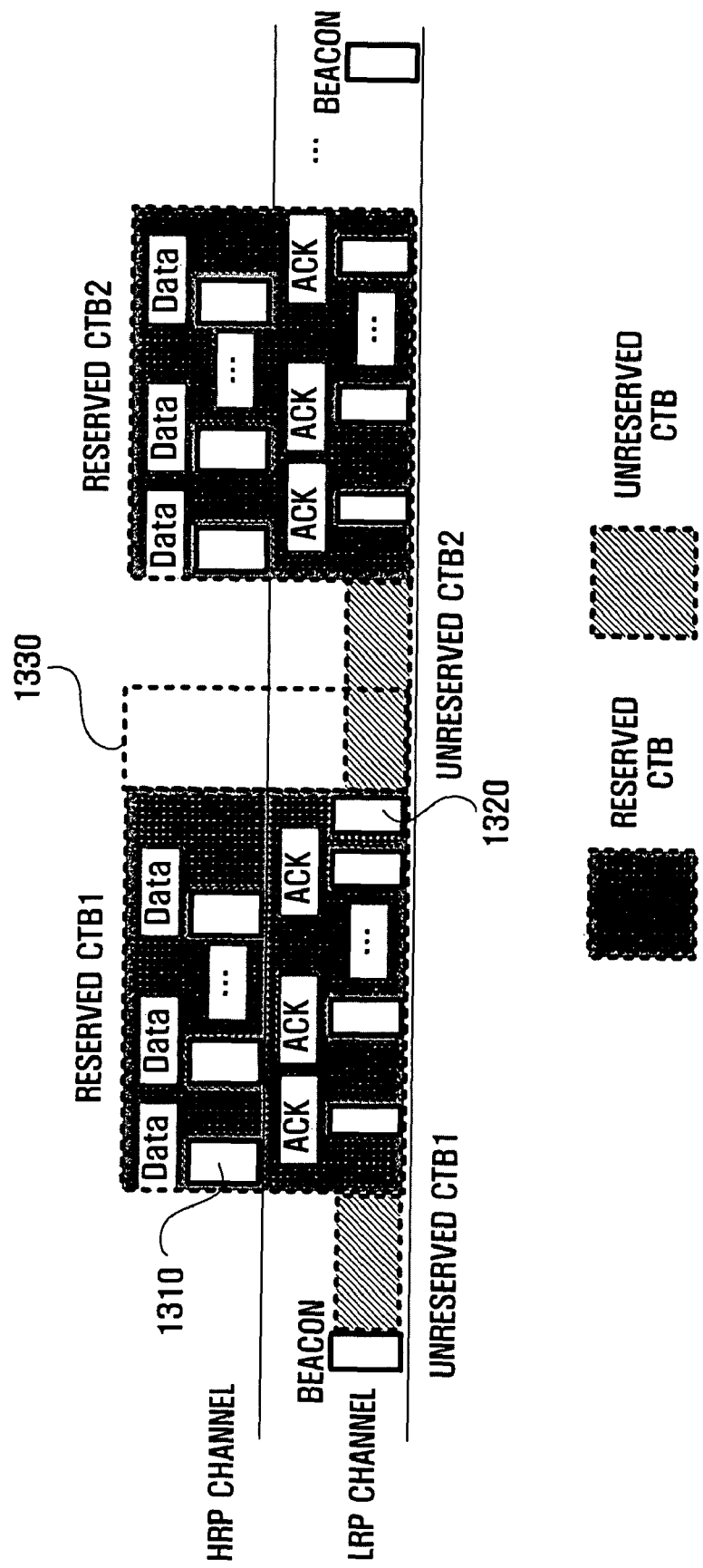
FIG. 13 is a diagram showing a time schedule, in a state where a reserved CTB is extended, according to an exemplary embodiment of the invention.

FIG. 13 shows a time schedule when the reserved CTB is extended, according to an exemplary embodiment of the invention. If an additional channel time is required due to the retransmission of the data packet 1310 that is lost during communication between the coordinator 110 and the station 120-1 in a reserved CTB1, the coordinator 110 may broadcast a packet 1320 including the CTB extension notice command 1200. Other stations 120-2 and 120-3 that receive the CTB extension notice command 1200 do not try to occupy the medium during the extension duration 1330 that is known through the CTB extension notice command 1200 in an unreserved CTB2 subsequent to the reserved CTB1. Accordingly, during the extension duration 1330, safe transmission of remaining data packets between the coordinator 110 and the station 120-1 can be performed.

Although a case where the CTB extension is required during the transmission of the data packet between the coordinator 110 and the station 120 has been described in the above exemplary embodiment, the CTB extension may occur during communication between the stations 120. If the extension of the reserved CTB is required while the stations 120 transmit the data packet during the reserved CTB through a link with no intervention of the coordinator 110 (hereinafter, referred to as a direct link), one station among the stations (preferably, a station that starts the direct link) may transmit the CTB extension request command to the coordinator 110. The CTB extension request command is an MAC command for the request of the extension of the reserved CTB.

Figure 14:
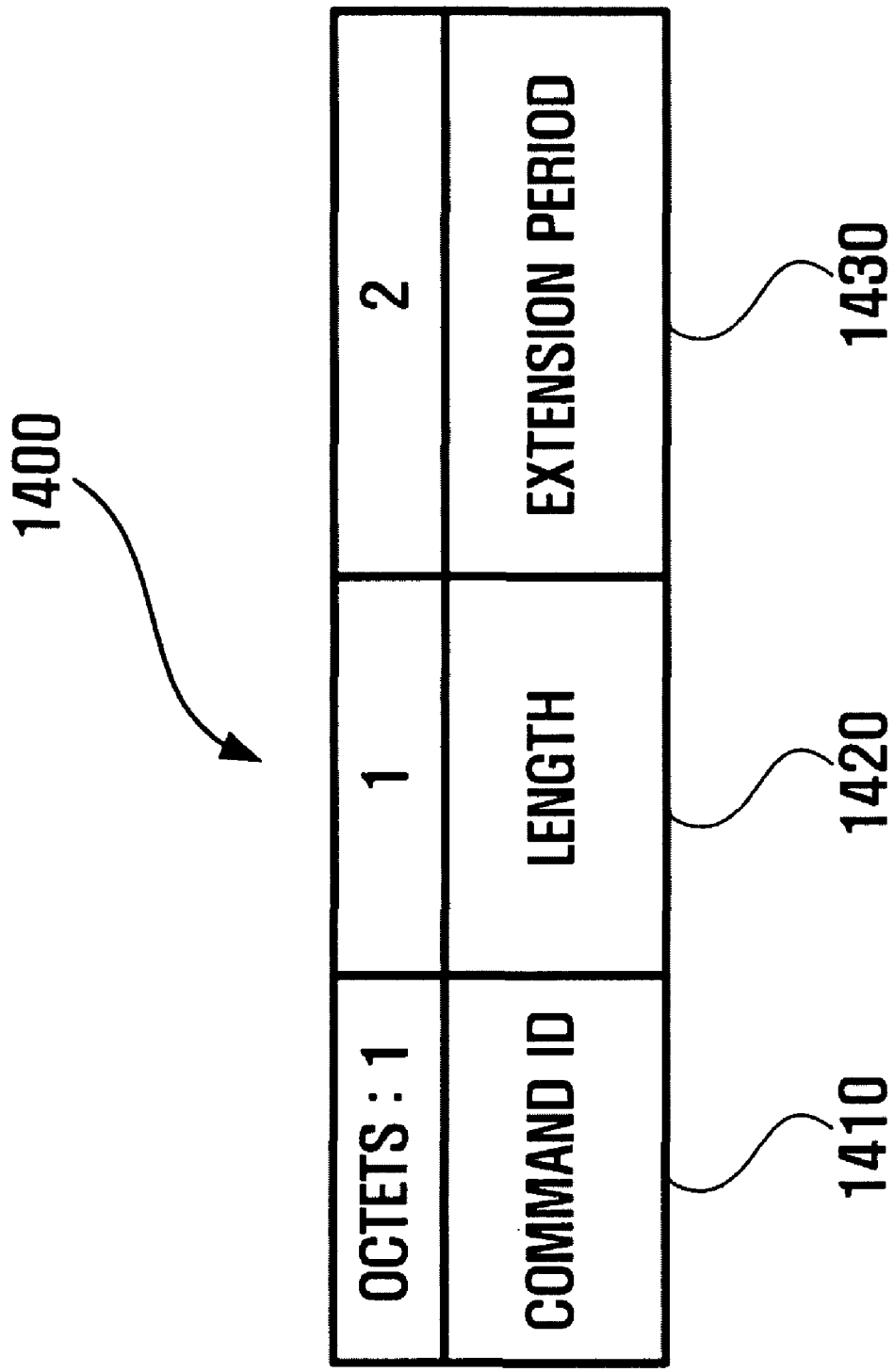
FIG. 14 is a diagram showing a CTB extension request command according to an exemplary embodiment of the invention.

FIG. 14 shows a CTB extension request command 1400 according to an exemplary embodiment of the invention. The CTB extension request command 1400 shown in FIG. 14 includes a command ID field 1410, a length field 1420, and an extension duration field 1430.

The command ID field 1410 includes an identifier for identifying the CTB extension request command 1400. The length field 1420 represents the length of the extension duration field 1430. The extension duration field 1430 includes extension duration information representing an additional time to be provided from the coordinator 110 upon request.

The coordinator 110 that receives the CTB extension request command 1400 from the station 120 allocates a predetermined additional time and broadcasts the CTB extension notice command 1200 including information about the allocated additional time. Here, the extension duration included in the CTB extension notice command 1200 is preferably consistent with the extension duration included in the CTB extension request command 1200. However, the invention is not limited thereto. Alternatively, the coordinator 110 may allocate an extension duration longer or shorter the time requested by the station 120.

Other stations that receive the CTB extension notice command 1200 do not try to occupy the medium during the extension duration that is known through the CTB extension notice command 1200 in the unreserved CTB subsequent to the current reserved CTB. Accordingly, the stations that are allocated with the extension duration can safely transmit remaining data packets during the extension duration.

The CTB extension request command 1400 and the CTB extension notice command 1200 may be transmitted in forms of independent packets or may be transmitted in a piggyback manner through a different packet, such as an ACK. Therefore, the communication channel can be used more efficiently.

The PHY capability information element 600 and the MAC capability information element 800 described above are just examples of the invention, and the invention is not limited thereto. Therefore, a different type of information field including various kinds of capability information described above can be formed.

Figure 15:
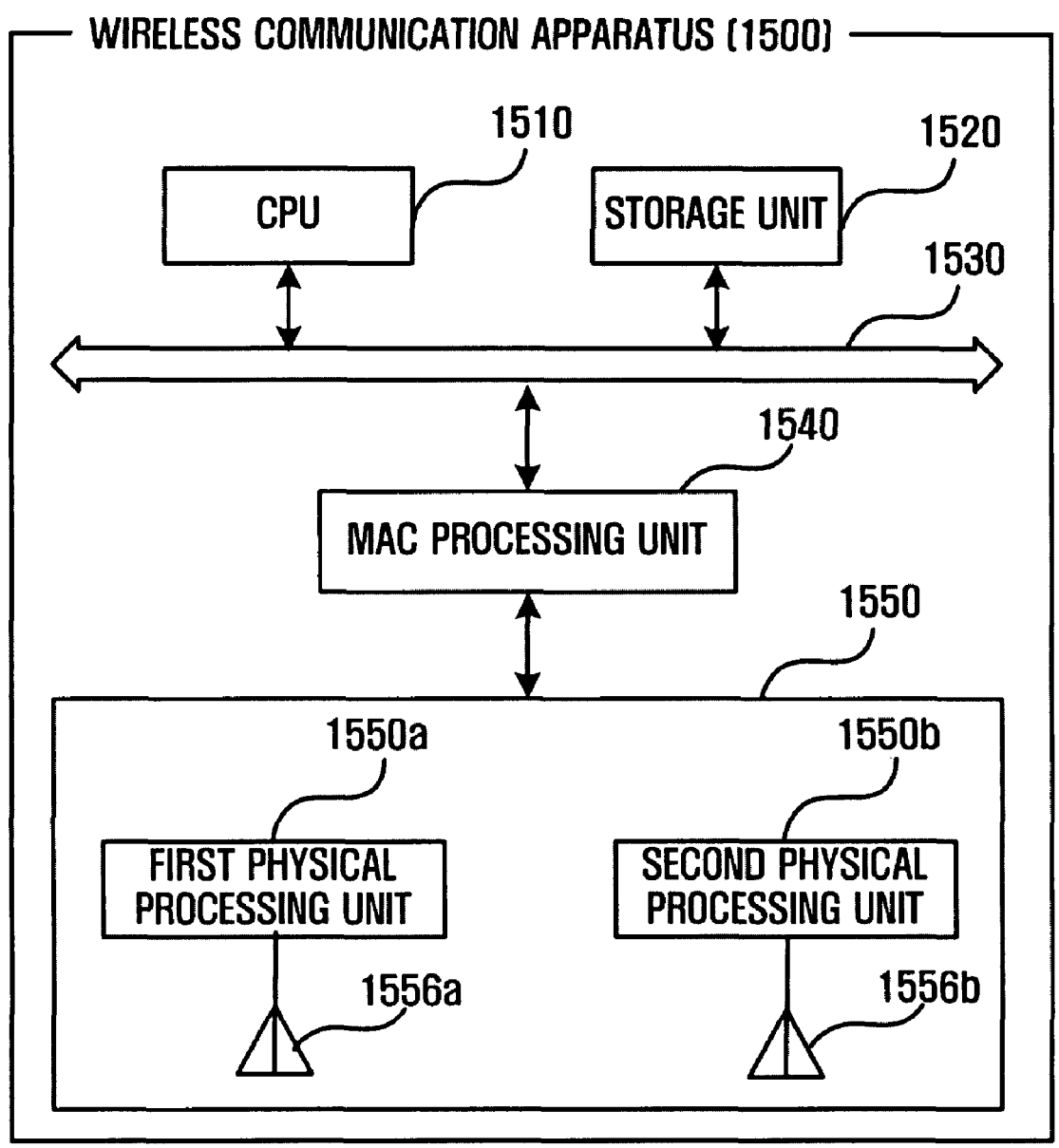
FIG. 15 is a block diagram showing a wireless communication apparatus according to an exemplary embodiment of the invention.

FIG. 15 is a block diagram showing a wireless communication apparatus 1500 according to an exemplary embodiment of the invention. The wireless communication apparatus 1500 includes a CPU 1510, a storage unit 1520, an MAC processing unit 1540, and a transmitting/receiving unit 1550.

The CPU 1510 controls other components connected to a bus 1530, and takes charge of a processing in an upper layer (for example, a Logical Link Control (LLC) layer, a network layer, a transmission layer, and an application layer) of an MAC layer among general communication layers. Accordingly, the CPU 1510 processes received data to be provided from the MAC processing unit 1540. Further, the CPU 1510 generates transmission data and supplies the generated transmission data to the MAC processing unit 1540. For example, the data to be generated or processed by the CPU 1510 may be uncompressed A/V data.

The storage unit 1520 stores the received data processed by the CPU 1510 or the transmission data generated by the CPU 1510. The storage unit 1520 may be implemented by a nonvolatile memory device, such as a ROM, a PROM, an EPROM, an EEPROM, or a flash memory, a volatile memory device, such as a RAM, a storage medium, such as hard disk or optical disk, or an arbitrary different memory that is known in the art.

The MAC processing unit 1540 functions as the MAC layer of the wireless communication apparatus 1500. The MAC processing unit 1540 generates packets to be transmitted to other devices or analyzes packets received from other devices. For example, the MAC processing unit 1540 may generate or analyze the MAC command packet 500 described with reference to FIG. 5.

Accordingly, the MAC processing unit 1540 can generate a packet including performance information of the wireless communication apparatus 1500. Further, the MAC processing unit 1540 can analyze performance information received from a different device so as to manage a communication process such that appropriate communication is kept with the corresponding device. The performance information of the wireless communication apparatus 1500 conceptually includes the PHY capability information described with reference to FIG. 6 and the MAC capability information described with reference to FIG. 8. The performance information may be stored in the storage unit 1520 or may be stored in the MAC processing unit 1540 itself.

Besides, the MAC processing unit 1540 may generate a data packet including uncompressed A/V data or may extract uncompressed A/V data from the data packet received from other devices and transmit the extracted uncompressed A/V data to the CPU 1510.

If the wireless communication apparatus 1500 functions as the coordinator 110, the MAC processing unit 1540 may mange timing information. Further, if the wireless communication apparatus 1500 operates as the station 120 in the wireless network 100, the MAC processing unit 1540 may analyze the beacon to be transmitted from the coordinator 110 so as to acquire timing information.

The transmitting/receiving unit 1550 transmits the packet to be transmitted from the MAC processing unit 1540 through a wireless medium. Further, the transmitting/receiving unit 1550 receives the packet transmitted from other devices and transmits the received packet to the MAC processing unit 1540.

The transmitting/receiving unit 1550 includes a first physical processing unit 1550a and a second physical processing unit 1550b. Of these, the first physical processing unit 1550a may be implemented by the LRP, and the second physical processing unit 1550b may be implemented by the HRP. That is, the first physical processing unit 1550a transmits/receives the packet through the LRP channel, and the second physical processing unit 1550b transmits/receives the packet through the HRP channel. The packet transmission/reception processes in the first physical processing unit 1550a and the second physical processing unit 1550b are controlled by the MAC processing unit 1540 in a time-division manner.

The second physical processing unit 1550b may include a coding unit (not shown) that codes data, and a modulating unit (not shown) that modulates the coded data.

The coding unit may classify the data into a plurality of bit streams and independently perform a coding job for the individual bit streams. At this time, the coding unit may apply different coding rates or the same coding rate for the individual bet streams. That is, the coding unit may use one coding mode of the UEP mode and the EEP mode. Which coding mode is used or which coding rate is applied may be determined according to an instruction of the MAC processing unit 1540.

The modulating unit may modulate the data using one of a plurality of modulation methods, such as Quadrature Phase Shift Keying (QPSK), 16-Quadrature Amplitude Modulation (QAM), and the like.

The second physical processing unit 1550b may include a demodulating unit (not shown) that demodulates a signal received through the wireless medium, and a decoding unit (not shown) that decodes the modulated data. The operations of the decoding unit and the demodulating unit may be designed to correspond to the operations of the coding unit and the modulating unit described above.

Further, the second physical processing unit 1550b may include an antenna 1556b. The antenna 1556b is preferably an array antenna such that beam steering can be performed. The array antenna has a plurality of antenna elements that are arranged in a line. However, the invention is not limited thereto. For example, the array antenna may have a plurality of antenna elements that are arranged in a two-dimensional matrix shape. In this case, fine and stereoscopic beam steering can be performed.

The first physical processing unit 1550a has a configuration similar to the second physical processing unit 1550b. However, the first physical processing unit 1550a and the second physical processing unit 1550b use different communication channels and transmit/receive different kinds of packets, as described above. Accordingly, the coding unit (not shown) and the decoding unit (not shown) of the first physical processing unit 1550a may use channel coding methods and channel coding parameters different from the coding unit and the decoding unit of the second physical processing unit 1550b. Further, the modulating unit (not shown) and the demodulating unit (not shown) of the first physical processing unit 1550a may use modulation and demodulation methods different from the modulating unit and the demodulating unit of the second physical processing unit 1550b.

The transmitting/receiving unit 1550 does not necessarily include both the first physical processing unit 1550a and the second physical processing unit 1550b. According to examples, the transmitting/receiving unit 1550 may include only the first physical processing unit 1550a. Further, the second physical processing unit 1550b may have only one of a function of transmitting the packet using the HRP channel and a function of receiving the packet using the HRP channel.

The components of the wireless communication apparatus 1500 described with reference to FIG. 15 may be implemented as a module. The term "module", as used herein, means, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to be executed on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

Figure 16:
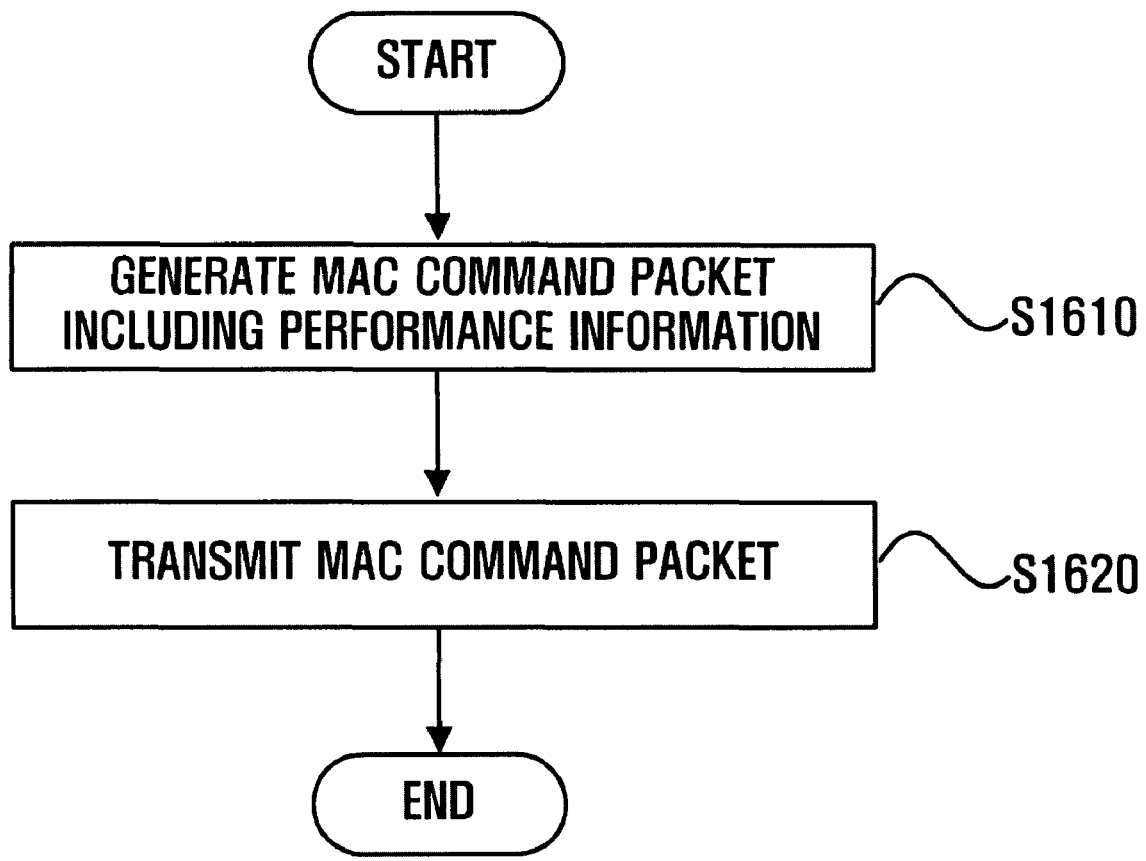
FIG. 16 is a flowchart showing a wireless communication process according to an exemplary embodiment of the invention.

FIG. 16 is a flowchart showing a wireless communication process according to an exemplary embodiment of the invention. Specifically, the flowchart of FIG. 16 shows a process in which a device transmits its own performance information to other devices. Steps in FIG. 16 can be performed by the wireless communication apparatus 1500 described with reference to FIG. 15.

The MAC processing unit 1540 generates the MAC command packet including the performance information of the wireless communication apparatus 1500 (S1610). As described above, the performance information of the wireless communication apparatus 1500 may include at least one of the MAC capability information and the PHY capability information of the wireless communication apparatus 1500. The process of generating the MAC command packet may be performed when other devices request for the performance information, when the wireless communication apparatus 1500 requests the coordinator 110 for the association with the wireless network 100, or when the performance information is to be known to at least one device even though a specific request is not received.

If the MAC command packet including the performance information is generated, the transmitting/receiving unit 1550 transmits the generated MAC command packet through the wireless medium (S1620). Since the MAC command packet is preferably transmitted through the LRP channel, the first physical processing unit 1550a may take charge of the transmission job at S1620.

FIG. 17 is a flowchart showing a wireless communication process according to an exemplary embodiment of the invention. Specifically, the flowchart in FIG. 17 shows a process in which a device acquires the performance information of other devices. The process shown in FIG. 17 can be performed by the wireless communication apparatus 1500 described with reference to FIG. 15.

First, the transmitting/receiving unit 1550 receives the MAC command packet including the performance information of other devices through a wireless medium (S1710). The MAC command packet including the performance information of other devices may be a beacon. Further, when a packet requesting the performance information is transmitted to other devices in advance under the control of the MAC processing unit 1540, a packet that is received as a response to the packet requesting the performance information may be used as the MAC command packet. Of course, even though there is no specific request, the MAC command packet including the performance information may be received from other devices. The MAC command packet is preferably transmitted through the LRP channel. Accordingly, the first physical processing unit 1550a can take charge of operation S1710.

Thereafter, the MAC processing unit 1540 acquires the performance information of other devices from the MAC command packet received by the transmitting/receiving unit 1550 (S1720). Here, as described above, the performance information may include at least one of the MAC capability information and the PHY capability information of the wireless communication apparatus 1500.

The MAC processing unit 1540 stores the acquired performance information in the storage unit 1520 (S1730). Upon communication with a specific device in future, the MAC processing unit 1540 may search the performance information of the corresponding device from the storage unit 1520, and control the communication with the specific device using the searched performance information (S1740). For example, the MAC processing unit 1540 checks HRP modes to be supported by the corresponding device through the performance information of the corresponding device. Then, using an HRP mode, which can achieve an optimum transmission efficiency in a current channel state, among the HRP modes to be commonly used by the corresponding device and the wireless communication apparatus 1500, data to be transmitted/received can be processed.

If operation S1740 is a job for transmitting/receiving uncompressed A/V data, the uncompressed A/V data may be transmitted or received by the second physical processing unit 1550*b*, and the response packet to the uncompressed A/V data may be transmitted or received by the first physical processing unit 1550*a*.

Those skilled in the art can create a program that performs the steps described with reference to FIGS. 16 and 17. The program may be recorded in a computer-readable storage medium and then the computer-readable storage medium may be connected to a computer. With this configuration, the exemplary embodiments described herein and other equivalent embodiments can be implemented. This still falls within the scope of the invention.

Although the present invention has been described in connection with the exemplary embodiments of the present invention, it will be apparent to those skilled in the art that various modifications and changes may be made thereto without departing from the scope and spirit of the invention. Therefore, it should be understood that the above exemplary embodiments are not limitative, but illustrative in all aspects.

According to the wireless communication method and apparatus of the invention, the performance information is shared by the devices, and thus more efficient communication can be performed.

What is claimed is:

1. A wireless communication method comprising:
generating a Media Access Control (MAC) packet comprising an MAC Protocol Data Unit (MPDU) including information of a device connected to a wireless network, the wireless network uses a first channel and a second channel supporting different transmission capabilities; and
transmitting the MAC packet,
wherein the information of the device includes at least one of an MAC capability and a physical layer (PHY) capability of the device and wherein the MAC capability includes information representing whether the device can request a coordinator of the wireless network for extension of a channel time allocated thereto.

2. The wireless communication method of claim 1, wherein the MAC capability further includes information representing whether at least one of information about a request to recommend a communication mode to be used in a current link state from the device to other devices and information about recommendation of the communication mode from the device to other devices can be processed.

3. The wireless communication method of claim 1, wherein the MAC capability further includes information representing whether the device can transmit data using the first channel.

4. The wireless communication method of claim 1, wherein the MAC capability further includes information representing whether the device can receive data using the first channel.

5. The wireless communication method of claim 1, wherein the MAC capability further includes information representing whether the device can request a coordinator of the wireless network for channel time allocation information.

6. The wireless communication method of claim 5, wherein the request of the channel time allocation information is performed if the device does not receive a beacon.

7. The wireless communication method of claim 6, wherein the packet requesting the channel time allocation information is transmitted in a contention based control period having a fixed time position.

8. The wireless communication method of claim 1, wherein the extension of the channel time is channel time allocation in which a part of an unreserved channel time or an entire unreserved time subsequent to the channel time allocated to the device is allocated for communication of the device.

9. The wireless communication method of claim 1, wherein the PHY capability includes a data processing mode.

10. The wireless communication method of claim 9, wherein the data processing mode includes at least one of a coding mode, a modulation method, and a coding rate.

11. The wireless communication method of claim 10, wherein the coding mode includes an Equal Error Protection mode that applies the same coding rates to bits constituting data to be transmitted and an Unequal Error Protection mode that applies, to at least one bit of the bits constituting data to be transmitted, a coding rate different from other bits.

12. A wireless communication apparatus that is connected to a wireless network which uses a first channel and a second channel supporting different data transmission capabilities, the wireless communication apparatus comprising:
a Media Access Control (MAC) processing unit which generates a packet including information of the wireless communication apparatus; and
a transmitting unit which transmits the packet,
wherein the information of the wireless communication apparatus includes at least one of an MAC capability and a PHY capability of the wireless communication apparatus and wherein the MAC capability includes information representing whether the wireless communication apparatus can request a coordinator of the wireless network for extension of a channel time allocated thereto.

13. The wireless communication apparatus of claim 12, wherein the MAC capability further includes information about whether at least one of information about a request to recommend a communication mode to be used in a current link state from the wireless communication apparatus to other devices and information about recommendation of the communication mode from the wireless communication apparatus to other devices can be processed.

14. The wireless communication apparatus of claim 12, wherein the MAC capability further includes information representing whether the wireless communication apparatus can transmit data using the first channel.

15. The wireless communication apparatus of claim 12, wherein the MAC capability further includes information representing whether the wireless communication apparatus can receive data using the first channel.

16. The wireless communication apparatus of claim 12, wherein the transmitting/receiving unit transmits the packet through the second channel.

17. The wireless communication apparatus of claim 12, wherein the MAC capability further includes information representing whether the wireless communication apparatus can request a coordinator of the wireless network for channel time allocation information.

18. The wireless communication apparatus of claim 17, wherein the request of the channel time allocation information is performed if the wireless communication apparatus does not receive a beacon.

19. The wireless communication apparatus of claim 17, wherein a packet for requesting the channel time allocation information is transmitted in a contention based control period having a fixed time position.

20. The wireless communication apparatus of claim 12, wherein the extension of the channel time is channel time allocation in which a part of an unreserved channel time or an entire unreserved time subsequent to the channel time allocated to the wireless communication apparatus is allocated for communication of the wireless communication apparatus.

21. The wireless communication apparatus of claim 12, wherein the PHY capability includes a data processing mode.

22. The wireless communication apparatus of claim 21, wherein the data processing mode includes at least one of a coding mode, a modulation method, and a coding rate.

23. The wireless communication apparatus of claim 22, wherein the coding mode includes an Equal Error Protection mode that applies the same coding rate to bits constituting data to be transmitted and an Unequal Error Protection mode that applies, to at least one bit of the bits constituting data to be transmitted, a coding rate different from other bits.

24. A wireless communication method comprising:
receiving a packet including information of a device connected to a wireless network which uses a first channel and a second channel supporting different transmission capabilities; and
storing the information of the device included in the packet, wherein the information of the device includes at least one of a Media Access Control (MAC) capability and a Physical layer (PHY) capability of the device and wherein the MAC capability includes information representing whether the device can request a coordinator of the wireless network for extension of a channel time allocated thereto.

25. The wireless communication method of claim 24, further comprising:
performing communication with the device based on the information of the device.

26. The wireless communication method of claim 24, wherein the first channel has a transmission capability which is higher than a transmission capability of the second channel.

27. The wireless communication method of claim 26, wherein the packet is received through the second channel.

28. A wireless communication apparatus comprising:
a receiving unit which receives a packet including information of a device connected to a wireless network which uses a first channel and a second channel supporting different transmission capabilities; and
a storage unit which stores the information of the device included in the packet,
wherein the information of the device includes at least one of a Media Access Control (MAC) capability and a Physical layer (PHY) capability of the device wherein the MAC capability includes information representing whether the device can request a coordinator of the wireless network for extension of a channel time allocated thereto.

29. The wireless communication apparatus of claim 28, further comprising:
a Media Access Control (MAC) processing unit which controls communication with the device based on the information of the device.

30. The wireless communication apparatus of claim 28, wherein the receiving unit receives the packet through the second channel.

* * * * *